United States Patent
Takano et al.

(10) Patent No.: US 11,785,479 B2
(45) Date of Patent: Oct. 10, 2023

(54) TERMINAL DEVICE AND COMMUNICATION METHOD

(71) Applicant: Sony Group Corporation, Tokyo (JP)

(72) Inventors: Hiroaki Takano, Tokyo (JP); Naoki Kusashima, Tokyo (JP); Shinichiro Tsuda, Tokyo (JP); Hiroki Matsuda, Tokyo (JP); Yifu Tang, Tokyo (JP); Hiroto Kuriki, Tokyo (JP)

(73) Assignee: SONY GROUP CORPORATION, Toyko (JP)

( * ) Notice: Subject to any disclaimer, the term of this patent is extended or adjusted under 35 U.S.C. 154(b) by 8 days.

(21) Appl. No.: 17/762,371

(22) PCT Filed: Sep. 30, 2020

(86) PCT No.: PCT/JP2020/037132
§ 371 (c)(1),
(2) Date: Mar. 22, 2022

(87) PCT Pub. No.: WO2021/070703
PCT Pub. Date: Apr. 15, 2021

(65) Prior Publication Data
US 2022/0345908 A1    Oct. 27, 2022

(30) Foreign Application Priority Data

Oct. 9, 2019    (JP) ................... 2019-186085

(51) Int. Cl.
*H04W 16/28* (2009.01)
(52) U.S. Cl.
CPC .................. *H04W 16/28* (2013.01)
(58) Field of Classification Search
CPC ... H04W 16/28; H04W 72/046; H04W 76/27; H04W 74/0833; H04B 7/0695; H04B 7/06; H04B 7/0617; H04B 7/0639
See application file for complete search history.

(56) References Cited

U.S. PATENT DOCUMENTS 10,680,699 B2 * 6/2020 Lee .................. H04B 7/0639
10,727,926 B2 * 7/2020 Guerreiro .......... H04B 7/0626
(Continued)

FOREIGN PATENT DOCUMENTS

JP    2019-4277 A    1/2019
JP    2019-500815 A    1/2019

OTHER PUBLICATIONS

Spreadtrum Communications: "Discussion on synchronization mechanism for NR V2X", 3GPP Draft; RI-1910008 V2X Sync_Final, 3rd Generation Partnership Project (3GPP), Mobile Competence Centre ; 650, Route Des Lucioles ; F-06921 Sophia-Antipolis Cedex ; France.
(Continued)

*Primary Examiner* — Jaison Joseph
(74) *Attorney, Agent, or Firm* — XSENSUS LLP

(57) ABSTRACT

A control unit receives at least one of a plurality of synchronization signals transmitted after undergoing beam sweeping via a wireless communication unit. The beam sweeping includes each of the plurality of synchronization signals forming a different beam and transmitted from the base station during a predetermined period of time. The control unit determines, from a plurality of pieces of beam sweeping configuration information, one piece of the configuration information based on priority between a plurality of types of beam sweeping and receives the synchronization signal or report the received synchronization signal to the base station using the one piece of the configuration information determined based on the priority. The number of the synchronization signals transmitted during a predetermined period of time varies among the plurality of pieces of beam sweeping configuration information.

10 Claims, 18 Drawing Sheets

(56) References Cited

U.S. PATENT DOCUMENTS

| 2019/0159042 | A1* | 5/2019 | Tomeba | H04W 16/28 |
|---|---|---|---|---|
| 2019/0215790 | A1 | 7/2019 | Kim | |
| 2019/0380099 | A1* | 12/2019 | Hakola | H04B 7/0695 |
| 2022/0030440 | A1* | 1/2022 | Park | H04W 24/10 |
| 2022/0216947 | A1* | 7/2022 | Kim | H04L 1/1819 |
| 2022/0386317 | A1* | 12/2022 | Tsuda | H04W 16/28 |

OTHER PUBLICATIONS

International Search Report and Written Opinion dated Dec. 22, 2020, received for PCT Application PCT/JP2020/037132, Filed on Sep. 30, 2020, 12 pages including English Translation.
CMCC, "Beam Sweeping Using Multi-Width Beams", 3GPP TSG-RAN WG1 Meeting #86bis R1-1609308, Oct. 10-14, 2016, 6 pages.
Ericsson, "Configuration of Paging Transmissions in Multi-Beam Operation", 3GPP TSG-RAN WG2 Meeting #101 R2-1802339, Feb. 26-Mar. 2, 2018, 5 pages.
Ericsson, "System Information for Narrow-Beam Sweeping and Wide-Beam Repetition", 3GPP TSG-RAN WG2 Meeting #97, R2-1700830, Feb. 13-17, 2017, 5 pages.
Samsung, "Discussions on Hierarchical Beam Sweeping", 3GPP TSG RAN WG1 Meeting #86bis, R1-1609123, Oct. 10-14, 2016, 3 pages.

* cited by examiner

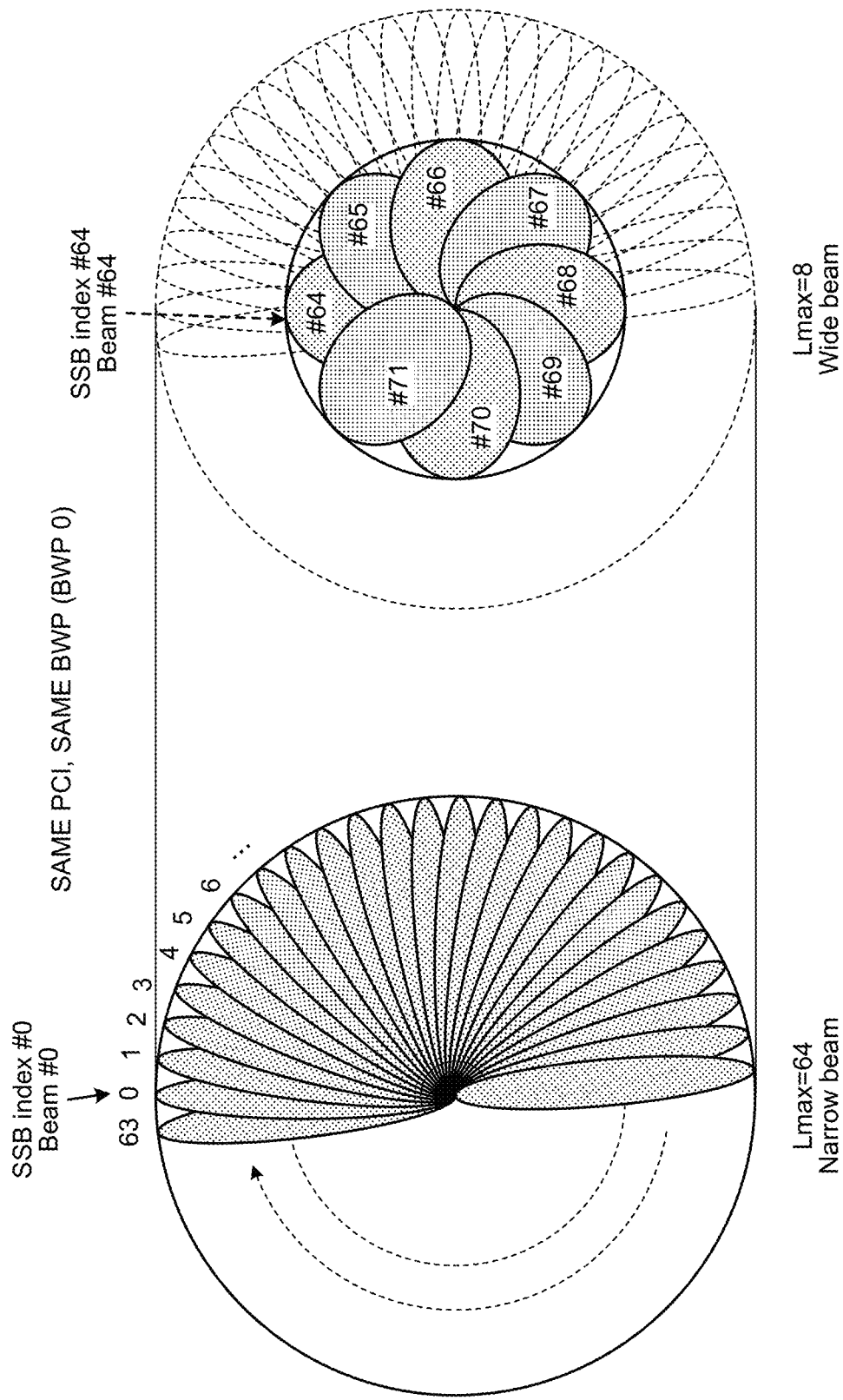

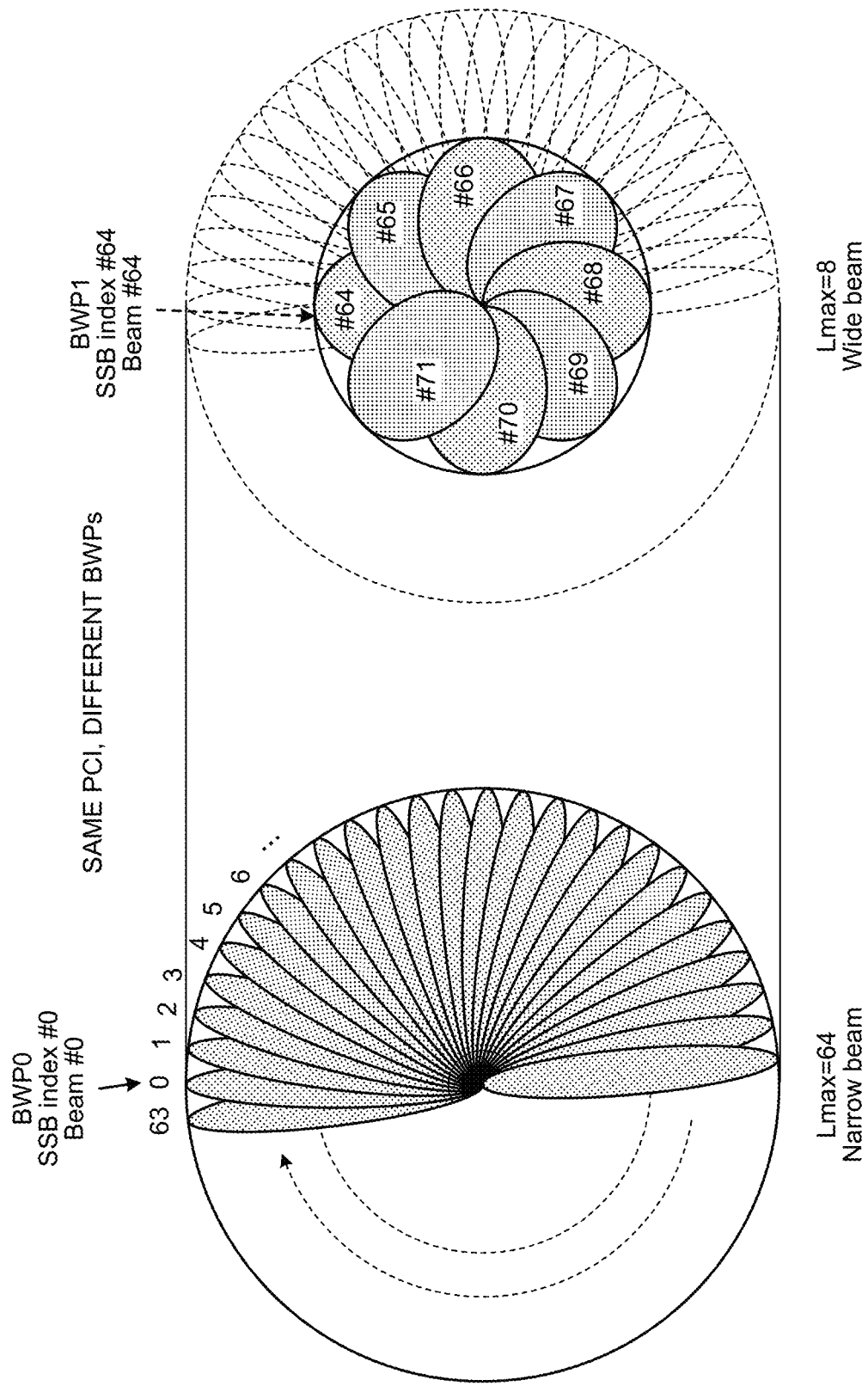

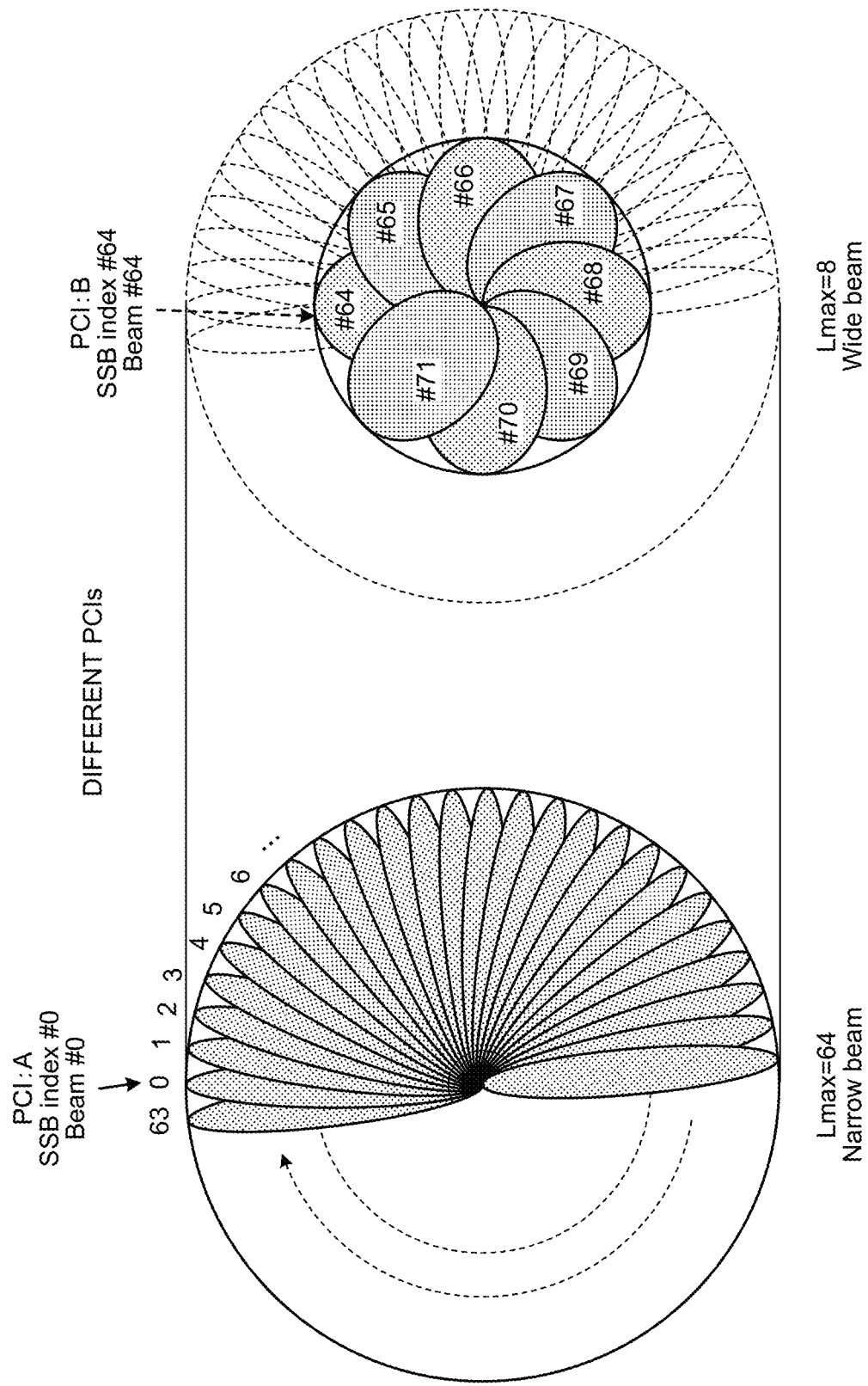

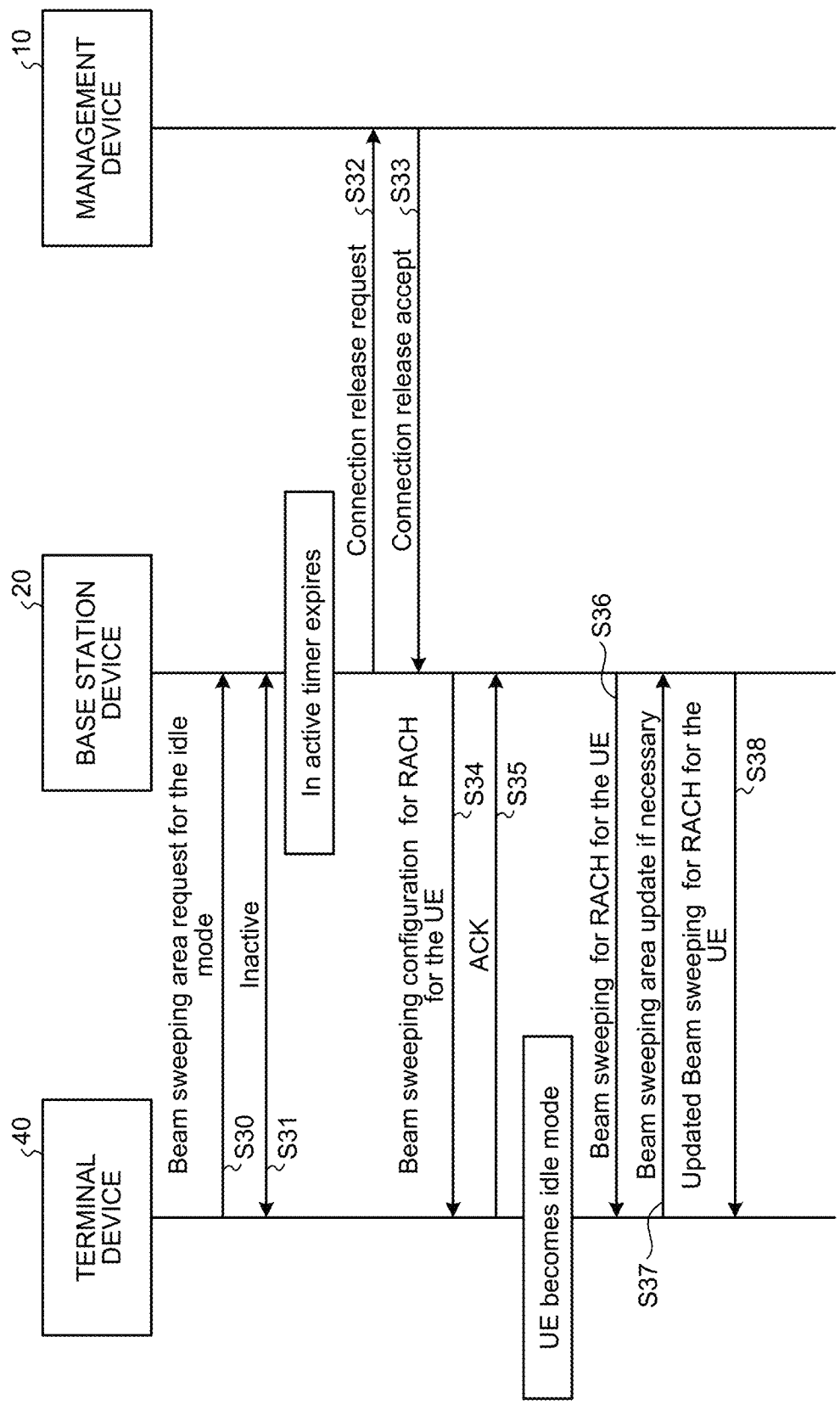

TERMINAL DEVICE AND COMMUNICATION METHOD

CROSS-REFERENCE TO RELATED APPLICATIONS

The present application is based on PCT filing PCT/JP2020/037132, filed Sep. 30, 2020, which claims priority to Japanese Patent Application No. 2019-186085, filed Oct. 9, 2019, the entire contents of each are incorporated herein by reference.

FIELD

The present disclosure relates to a terminal device and a communication method.

BACKGROUND

Currently, in the third generation partnership project (3GPP), various technologies are being studied to increase the capacity of cellular systems in order to accommodate explosively increasing traffic. For example, Patent Literature 1 discloses a beam sweeping procedure using a rough beam and an accurate beam.

CITATION LIST

Patent Literature

Patent Literature 1: JP 2019-4277 A

SUMMARY

Technical Problem

In the prior art, the base station performs transmission sweeping using a rough beam. The terminal reports a rough beam number desired for the device of the terminal to the base station. The base station performs transmission sweeping using an accurate beam corresponding to a rough beam of the number reported by the terminal. The terminal reports an accurate beam number desired for the device of the terminal to the base station. The base station uses an accurate beam of the number reported by the terminal to transmit downlink user data to the terminal.

However, in the prior art, even when the terminal is close to the base station, the terminal and the base station communicate with each other by using an accurate beam, and the beam cannot be operated efficiently.

Therefore, the present disclosure proposes a terminal device and a communication method capable of efficiently operating a beam.

Solution to Problem

To solve the above problem, a terminal device according to the present disclosure includes: a wireless communication unit; and a control unit that receives at least one of a plurality of synchronization signals transmitted after undergoing beam sweeping via the wireless communication unit. The beam sweeping includes each of a plurality of synchronization signals forming a different beam and transmitted from a base station during a predetermined period of time. The control unit determines, from among a plurality of pieces of beam sweeping configuration information, one piece of the configuration information based on a priority between a plurality of types of beam sweeping, and receives the synchronization signal or reports the received synchronization signal to the base station by using the one piece of the configuration information determined based on the priority. A number of synchronization signals transmitted during the predetermined period of time is different among the plurality of pieces of beam sweeping configuration information.

BRIEF DESCRIPTION OF DRAWINGS

FIG. 12A is a diagram illustrating an example of a first beam sweeping and a second beam sweeping.

FIG. 12B is a diagram illustrating an example of the first beam sweeping and the second beam sweeping.

FIG. 12C is a diagram illustrating an example of the first beam sweeping and the second beam sweeping.

FIG. 17 is a diagram illustrating an operation example of a management device 10, a base station device 20, and a terminal device 40 according to a third embodiment.

DESCRIPTION OF EMBODIMENTS

Figure 1:
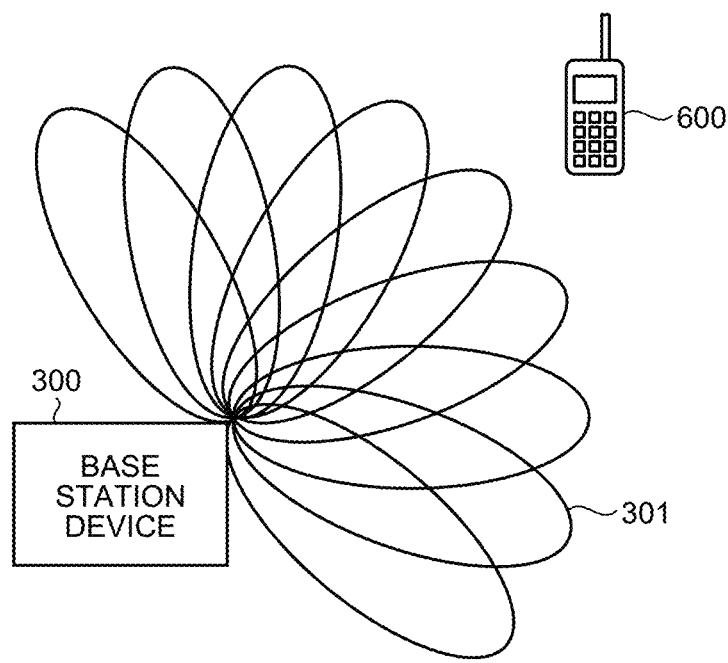
FIG. 1 is a diagram for explaining an example of low frequency beamforming.

Hereinafter, embodiments of the present disclosure will be described in detail with reference to the drawings. Note that in each of the following embodiments, the same parts are denoted by the same reference numerals, and redundant description will be omitted.

In addition, the present disclosure will be described according to the order of items shown below.
1. Introduction
   1-1. Necessity of beam
   1-2. Need to determining beam
   1-3. Beam sweeping
   1-4. Types of procedures for performing beam sweeping 1-5. Overhead problem of beam of synchronization signal
1-6. Outline of embodiment
2. First embodiment
　2-1. Overall configuration of communication system
　2-2. Configuration of management device
　2-3. Configuration of base station device
　2-4. Configuration of terminal device
　2-5. Operation of communication system
　2-6. Operation example
3. Second embodiment
　3-1. Operation example
4. Third embodiment
　4-1. Operation example
5. Modification example

1. Introduction

1-1. Necessity of Beam

Figure 2:
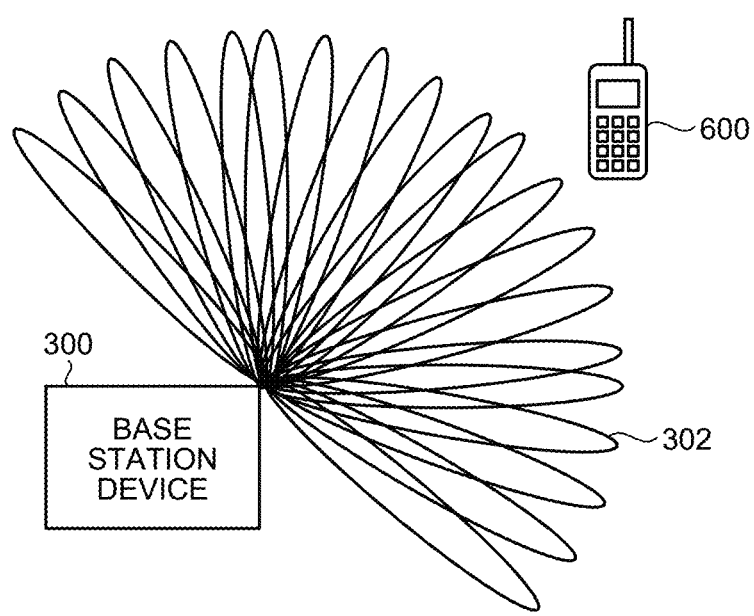
FIG. 2 is a diagram for explaining an example of high frequency beamforming.

Wireless access technologies such as Long Term Evolution (LTE) and New Radio (NR) are being studied by the third generation partnership project (3GPP.) For example, in 3GPP, the use of a wide frequency band such as 2 GHz to 100 GHz in NR is being considered. When using a frequency from 2 GHz to 100 GHz, especially when the frequency becomes high, it is necessary to obtain a gain by beamforming that narrows a direction of transmitting radio waves to compensate for a propagation loss so as to compensate for a propagation loss with the beam gain. Obtaining a high beam gain requires a sharp beam. FIG. 1 is a diagram for explaining an example of low frequency beamforming. FIG. 2 is a diagram for explaining an example of high frequency beamforming. FIGS. 1 and 2 illustrate a base station device 300 and a terminal device 600. In FIG. 1, beam sweeping is performed on a beam 301, which has a wide width with respect to a direction in which the base station device 300 transmits radio waves. In FIG. 2, beam sweeping is performed on a beam 302, which has a narrow width with respect to the direction in which the base station device 300 transmits radio waves. In FIG. 2, since the beam is narrowed, it can be seen that a larger number of beams is required than in FIG. 1 even when beam sweeping is performed in the same range.

LTE shall include LTE-advanced (LTE-A), LTE-advanced pro (LTE-A Pro), and evolved universal terrestrial radio access (EUTRA). In addition, NR shall include new radio access technology (NRAT) and further EUTRA (FEUTRA). A single base station may manage a plurality of cells. In the following description, a cell corresponding to LTE is referred to as an LTE cell, and a cell corresponding to NR is referred to as an NR cell.

NR is the next generation (5th generation) LTE radio access technology (RAT). NR is a radio access technology that can correspond to various use cases including enhanced mobile broadband (eMBB), massive machine type communications (mMTC), and ultra-reliable and low latency communications (URLLC). NR is being studied with the aim of creating a technical framework that corresponds to usage scenarios, requirements, and deployment scenarios for the above-mentioned use cases. NR shall include New Radio Access Technology (NRAT) and Further EUTRA (FEUTRA).

In addition, a terminal device (also referred to as a mobile station, mobile station device, or terminal) may be referred to as a user equipment (UE).

1-2. Need to Determine Beam

Figure 3:
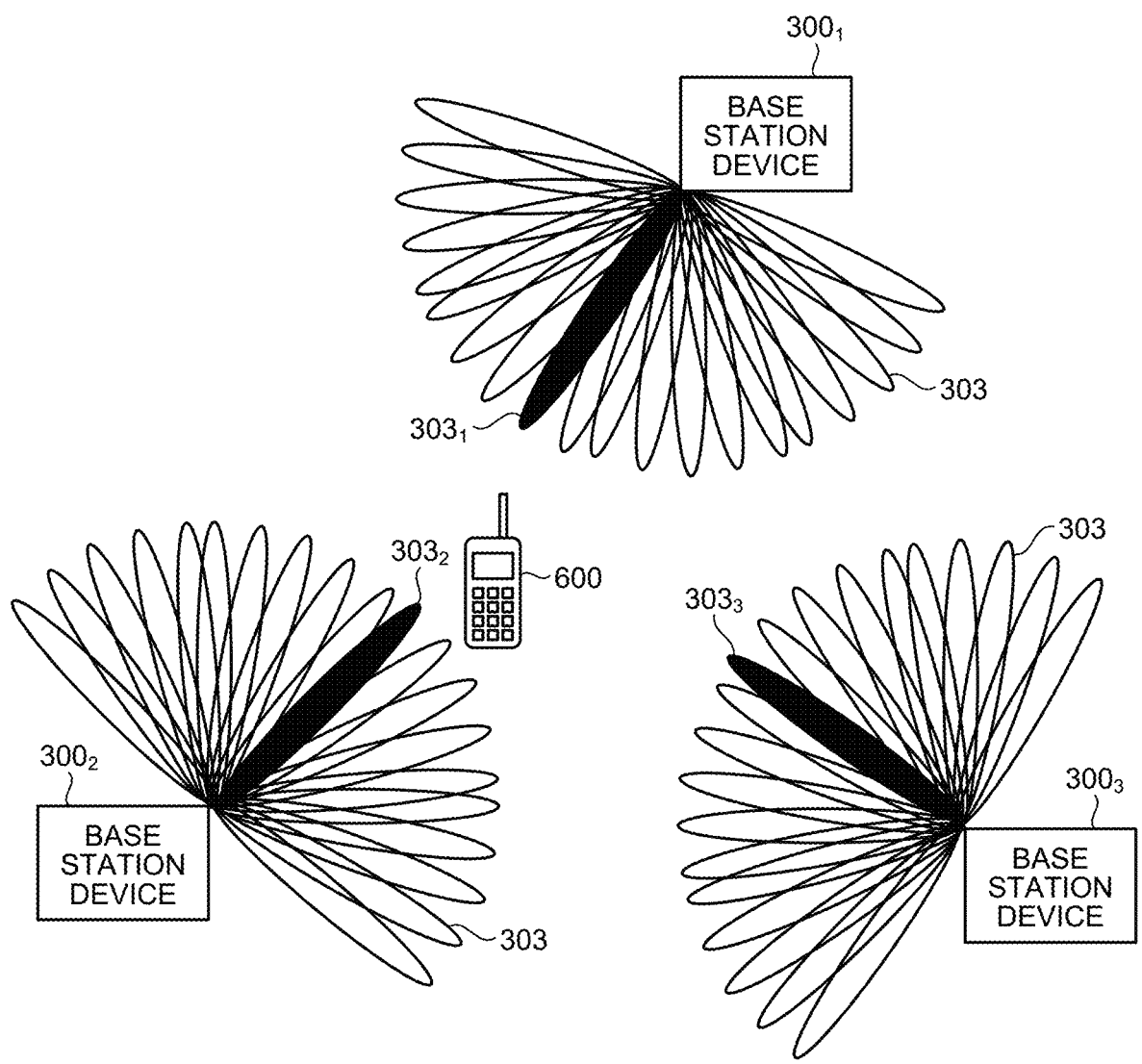
FIG. 3 is a diagram for explaining an example of determining a beam.

The terminal device and the base station each have a transmitting beam and a receiving beam. For downlink, it is necessary to determine the transmitting beam of the base station and the receiving beam of the terminal device. For uplink, it is necessary to determine the transmitting beam of the terminal device and the receiving beam of the base station. For example, a beam is determined so that the received power of the beam on a receiving side is maximized from among a plurality of beams. FIG. 3 is a diagram for explaining an example of determining a beam. FIG. 3 illustrates a beam 303 transmitted from each of a plurality of base stations $300_1$, $300_2$, and $300_3$ to the terminal device 600. In FIG. 3, beams $303_1$, $303_2$, and $303_3$, in which received powers become maximum in the terminal device 600, are illustrated in black for each of the base stations $300_1$, $300_2$, and $300_3$. For example, the terminal device 600 determines the beams $303_1$, $303_2$, and $303_3$ as transmitting beams to the base stations $300_1$, $300_2$, and $300_3$.

1-3. Beam Sweeping

To determine the beam, sweeping beams used for transmission is performed. Even on the receiving side, which transmitting beam and receiving beam are optimal can be determined, when receiving one of the transmitting beams, by measuring the received power of the beam while sweeping the receiving beams on the receiving side. This is a procedure required both when the terminal device receives a beam and when the base station receives a beam. This procedure is called beam management. Hereinafter, the discussion will proceed mainly in a case of downlink beam sweeping (management).

1-4. Types of Procedures for Performing Beam Sweeping

Beam sweeping can be performed in two procedures. The first procedure is beam sweeping using a synchronization signal (e.g., SSB (synchronization signal (SS)/physical broad band channel (PBCH) block)). The synchronization signal is a procedure in which the terminal device synchronizes with the network side based on a synchronization signal transmitted from the base station. The reason why synchronization is required is that if the terminal device does not recognize a frame transmitted from the base station, uplink and downlink transmissions cannot be performed smoothly.

The second procedure is beam sweeping using a downlink reference signal and an uplink reference signal such as a channel state information reference signal (CSI-RS) and a sounding reference signal (SRS).

Beam sweeping using a synchronization signal, which is the first procedure, is provided for the entire cell. On the other hand, beam sweeping using a CSI-RS and an SRS, which is the second procedure, enables beam sweeping provided for one terminal device. In addition, a beam using a synchronization signal is often a beam rougher than a beam of a CSI-RS or an SRS.

In the present disclosure, the discussion will proceed focusing on the first beam sweeping. This is because, since the first beam sweeping provides a beam for the coverage of the entire cell, the beam wastefully uses a lot of frequency and time resources.

1-5. Overhead Problem of Beam of Synchronization Signal

In order for a terminal device to connect to the network for the first time, the terminal device needs to connect to the base station using a procedure called random access, in which a preamble may collide with another terminal device. The reason why the terminal device connects to the base station using random access is that, since the terminal device is not connected to the base station, there is no means for the base station to allocate resources to the terminal device.

When using a synchronization signal for beam management, a plurality of synchronization signals beamformed in different directions are transmitted in sequence (i.e., beam sweeping). The terminal device monitors the quality (e.g., received power) of the plurality of synchronization signals transmitted through beam sweeping. Then, a synchronization signal having quality that exceeds a predetermined threshold value is recognized as a transmitting beam of the base station desirable for the terminal device.

Moreover, a random access occasion for random access is prepared for the number of beams transmitted from the base station. The terminal device transmits a random access preamble with a random access occasion corresponding to the synchronization signal having quality that exceeds the predetermined threshold value. From the association between the beam (beamformed synchronization signal) and the random access occasion, the base station can know which transmitting beam of the base station is desirable for the terminal device.

As the frequency increases and the beam becomes sharper, the number of beams required for beam sweeping increases. This is because when an angle covered by the beam changes from 10 degrees to 1 degree, it is simply necessary to use 10 times as many as the beams to cover various directions. For example, while 10 beams are required at 6 GHz, 60 beams are required at 60 GHz for beam sweeping, that is, the beams are transmitted to 60 locations at different times. Otherwise, the coverage cannot be covered.

Figure 4:
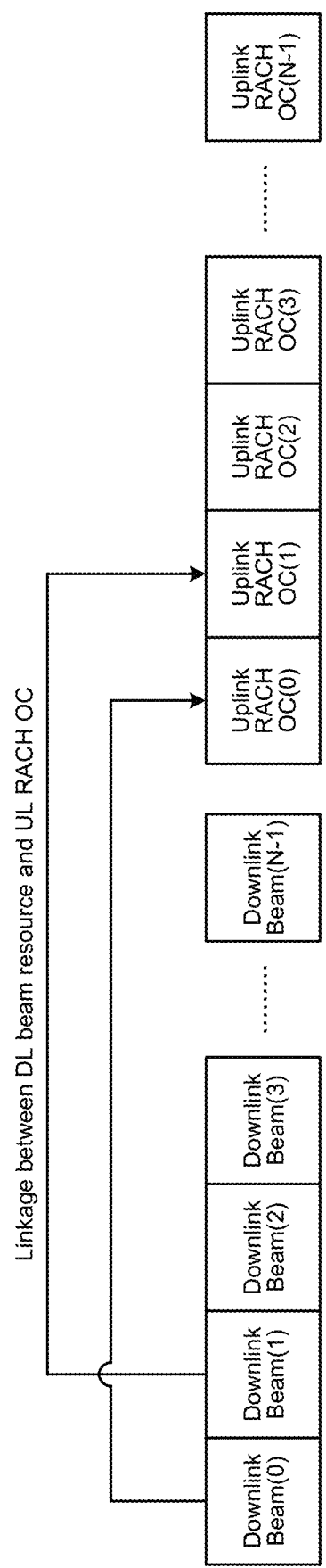
FIG. 4 is a diagram for explaining a frequency and time resources of a beam required for beam sweeping.

FIG. 4 is a diagram for explaining a frequency and time resources of a beam required for beam sweeping. In downlink beam sweeping, the frequency and time resources are required for the number of beams to be transmitted. In addition, the frequency and time resources of uplink random access occasions are required for the number of beams. As the number of beams required for beam sweeping increases, an overhead due to the frequency and time resources required for downlink beam sweeping and an overhead due to an increase in the number of uplink random access occasions, as well as an increase in the number of beams, to inform which beam is optimal become problems.

The problems will be more specifically described. In 3GPP Rel.15, a synchronization signal for a terminal device (UE) to perform downlink synchronization with the network is called an SS/PBCH block (SSB). The SSB is periodically transmitted from the base station (radio access network (RAN)) into a cell as an SSB burst (SS burst) composed of a plurality of SSBs. An identifier SSB index is added to each of the plurality of SSBs in one SSB burst. The number of SSBs in one SSB burst can be any of four, eight, and 64 depending on the frequency range. The SSBs are beamformed and transmitted in different directions. The terminal device reports, to the base station, in which direction the beam reception quality has been good with a random access channel (RACH) occasion associated with the SSB index.

A frequency band and the number of beams (SSBs) per unit time (e.g., one SS burst or one SSB burst) are linked. In 3GPP, the maximum number of beams (SSBs) per unit time (e.g., one SS burst or one SSB burst) is defined as Lmax. For example, a band with a carrier frequency of 6 GHz or less corresponds to a frequency range of FR (frequency range) 1. A band with a carrier frequency of 6 GHz or higher corresponds to a frequency range called FR2.

Figure 5:
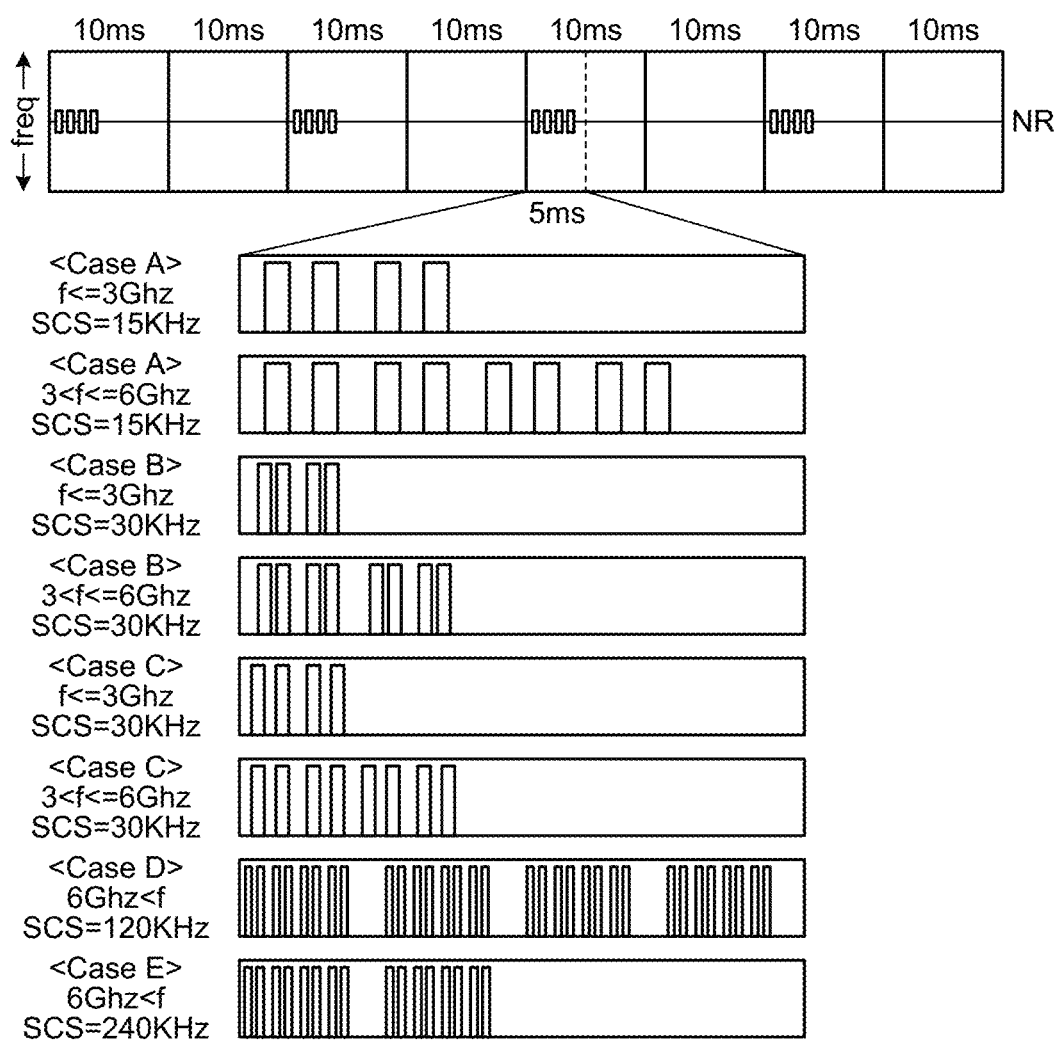
FIG. 5 is a diagram illustrating a conventional synchronization signal block (SSB) transmission pattern.

FIG. 5 is a diagram illustrating a conventional SSB transmission pattern. Cases A to E are conventional SSB transmission patterns. In the case of FR1 (i.e., the cases A to C), the number of SSBs transmitted is four or eight per unit time (half frame: 5 ms or one SSB burst). In the case of FR2 (i.e., the cases D and F), the number of SSBs transmitted is 64 per unit time (half frame: 5 ms or one SSB burst). In other words, since FR2 has a frequency range of 24250 MHz to 52600 MHz, Lmax=64 is defined as the number of SSBs that can be coped with even in this frequency band.

That is, in the case of FR2 (6 GHz band or higher), a maximum of 64 beamformed SSBs (64 types) is required, which is more than the case of FR1. In other words, in the case of FR1 (the cases A to C), the maximum number of SSBs transmitted per unit time (half frame: 5 ms) is four or eight. Therefore, in the case of FR1, it is sufficient to perform beam sweeping with a maximum of four or eight beams (beamformed SSBs). However, in the case of FR2 (the cases D and F), the maximum number of SSBs transmitted per unit time (half frame: 5 ms) is 64. Therefore, in the case of FR2, it is necessary to perform beam sweeping with a maximum of 64 beams (beamformed SSBs). This is because in a high frequency band (for example, 6 GHz band or higher), a propagation loss becomes larger than in a low frequency band, and it is necessary to narrow the beams.

However, in the future, the frequency band may be expanded, and a frequency band higher than 52600 MHz (e.g., 100 GHz band) and a frequency range (e.g., FR3) may be newly defined. In such a case, since it is necessary to further narrow the beams, 64 may not be enough for the maximum number of SSBs (Lmax) in one SSB burst to cover the same geographical area. For example, in the 100 GHz band, Lmax=64 is not enough, and Lmax may be larger than 64, for example, 128 or 256.

However, when the number of beams (SSBs) to be beamswept is large, the overhead of the downlink frequency and time resources becomes large, which consumes the frequency and time resources, and the beams cannot be operated efficiently.

Even in a cell in a high frequency band of 6 GHz band or higher, a terminal device geographically close to the base station that forms the cell has a smaller propagation loss than a terminal device geographically far away. In other words, the terminal device that is geographically close to the base station that forms the cell need not have narrower SSB beams than the terminal device geographically far away. In order to narrow down the beams, many antenna elements are required and the processing is complicated. Therefore, even for a cell in a high frequency band of 6 GHz band or higher, it is desirable that signals are provided by beams that are not excessively narrowed for the terminal device geographically close to the base station that forms the cell. For example, even if the cell is in a high frequency band of 6 GHz band or higher, four or eight SSBs (Lmax) may be sufficient as shown in FR1 (the cases A to C) for a terminal device close to the base station that forms the cell.

From the viewpoint of the terminal device, compared to the case where the maximum number of SSBs transmitted per unit time (half frame: 5 ms, SS burst) is 64, for a beam (or cell) for which the number of SSBs (Lmax) is four or eight such as FR1 (the cases A to C), the frequency and time resources used for beam sweeping decreases, and the frequency and time resources that can be used for others (for example, data communication for a terminal device (UE)) increases.

1-6. Outline of Embodiment

Therefore, in the present embodiment, beams are operated efficiently by reducing the waste as described above. As will be described in detail later, in the present embodiment, two configurations with different maximum numbers of SSBs transmitted per unit time (half frame: 5 ms, SS burst) are prepared, and different configurations are used according to the terminal device (UE). As a result, the beams can be efficiently operated.

The outline of the present embodiment has been described above, and a communication system according to the present embodiment will be described in detail below.

2. First Embodiment

2-1. Overall Configuration of Communication System

Figure 6:
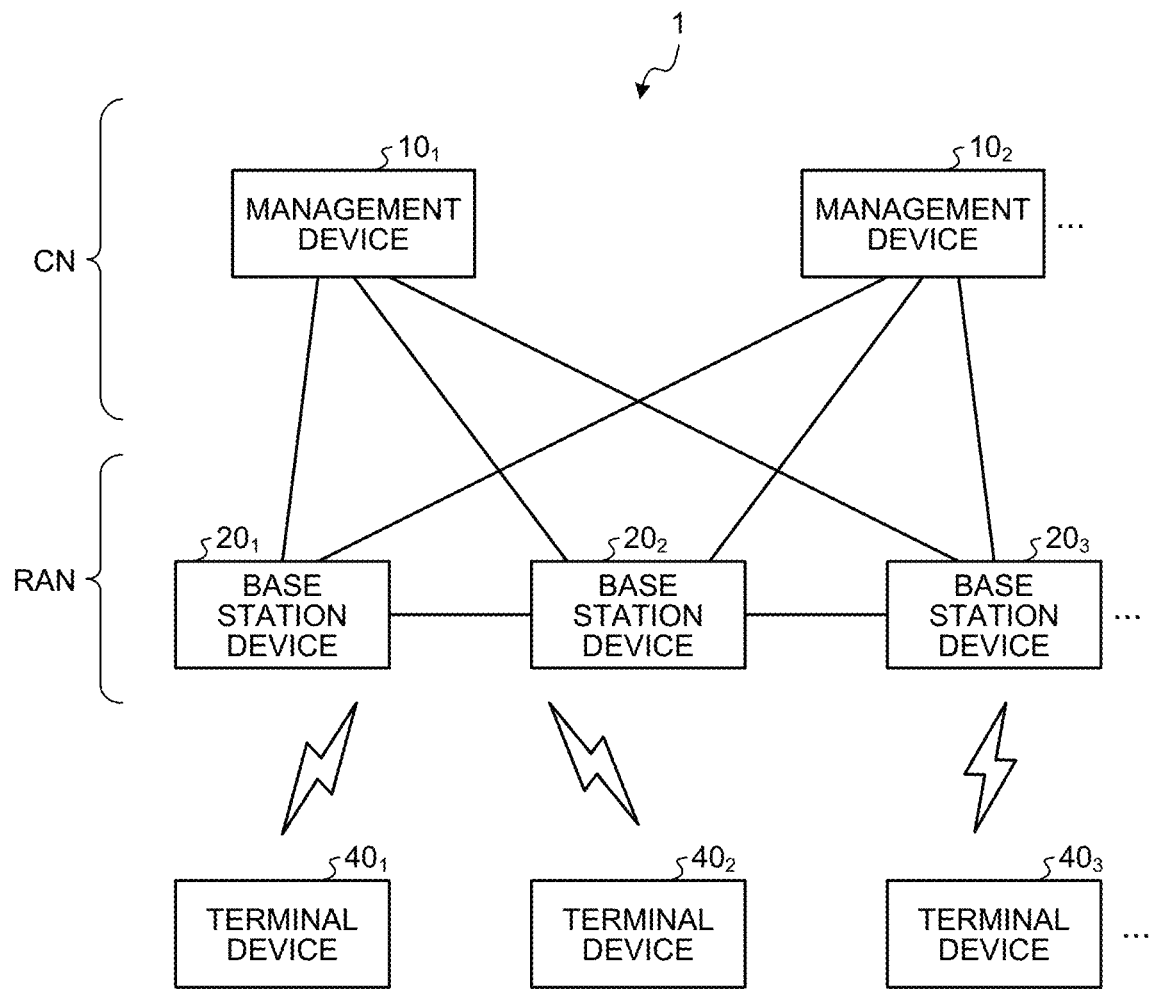
FIG. 6 is a diagram illustrating a configuration example of a communication system according to a first embodiment.

FIG. 6 is a diagram illustrating a configuration example of a communication system 1 according to the first embodiment. The communication system 1 is a wireless communication system that provides a wireless access network to a terminal device. For example, the communication system 1 is a cellular communication system using wireless access technology such as LTE and NR. Here, the wireless access network may be evolved universal terrestrial radio access network (E-UTRAN) or next generation radio access network (NG-RAN).

As illustrated in FIG. 6, the communication system 1 includes a management device 10, a base station device 20, and a terminal device 40. The communication system 1 provides a user with a wireless network capable of mobile communication by operating wireless communication devices constituting the communication system 1 in cooperation with each other. The wireless network of the present embodiment is composed of a wireless access network RAN and a core network CN. The wireless communication devices are devices having a wireless communication function, and in the example of FIG. 6, the base station device 20 and the terminal device 40 correspond to the wireless communication devices.

The communication system 1 may include pluralities of the management devices 10, the base station devices 20, and the terminal devices 40. In the example of FIG. 6, the communication system 1 includes management devices $10_1$, $10_2$ and the like as the management devices 10. In addition, the communication system 1 includes the base station devices $20_1$, $20_2$, $20_3$ and the like as the base station devices 20. Moreover, the communication system 1 includes terminal devices $40_1$, $40_2$, $40_3$ and the like as the terminal devices 40.

The devices in the figure may be considered as devices in a logical sense. That is, a part of the devices in the figure may be realized by a virtual machine (VM), a container, a docker and the like and may be implemented on physically the same hardware.

An LTE base station may be referred to as evolved node B (eNodeB) or eNB. An NR base station may be referred to as Next Generation RAN node (NGRAN Node), gNodeB or gNB. In addition, in LTE and NR, a terminal device (also referred to as a mobile station, mobile station device, or terminal) may be referred to as user equipment (UE). The terminal device is a type of communication device and is also referred to as mobile station, a mobile station device, or terminal.

In the present embodiment, the concept of a communication device includes not only a portable mobile device (terminal device) such as a mobile terminal, but also a device installed on a structure or a mobile body. The structure or the mobile body itself may be regarded as a communication device. In addition, the concept of the communication device includes not only a terminal device but also a base station device and a relay device. The communication device is a type of processing device and information processing device. Moreover, the communication device can be paraphrased as a transmitting device or a receiving device.

Management Device

Each of the management devices 10 is a device that manages a wireless network. For example, the management device 10 is a device that manages the communication of each of the base station devices 20. For example, the management device 10 is a device that functions as the mobility management entity (MME), the access and mobility management function (AMF), or the session management function (SMF). The MME is connected to EUTRAN via an S1 interface and controls non-access stratum (NAS) signaling with a UE and manages UE mobility. The AMF is connected to NGRAN by an NG interface and controls non-access stratum (NAS) signaling with a UE and manages UE mobility.

The management device 10 may be included in the core network CN together with a gateway device and the like. The core network CN is, for example, a network owned by a predetermined entity (subject) such as a mobile communication operator. For example, the core network CN is the evolved packet core (EPC) or 5G core network (5GC). The predetermined entity may be the same as the entity that uses, operates, and/or manages the base station device 20, or may be different.

The core network transfers user data between a packet data network (OPDN) or a data network (DN) and the RAN, in addition to a control plane (C-Plane) node such as the management device 10. A user plane (U-Plane) node may be included. The U-Plane node in the EPC may include a serving gateway (S-GW) and a PDN-gateway (P-GW). The U-Plane node in 5GC may include the U-Plane function (UPF). For example, the management device 10 manages the positions of the terminal devices 40 (UE) in the communication system 1 for each terminal device 40 in an area unit (for example, tracking area and RAN notification area) composed of a plurality of cells. The management device 10 may grasp and manage which base station (or cell) the terminal device 40 is connected to, in a communication area of which base station (or cell) the terminal device 40 exists, and the like for each terminal device 40 on a cell-by-cell basis.

The management device 10 may have the gateway function. For example, if the core network is the EPC, the management device 10 may have a function as the S-GW or the P-GW. Moreover, if the core network is 5GC, the management device 10 may have a function as the user plane function (UPF). In addition, the management device 10 may be the SMF, the policy control function (PCF), the unified data management (UDM), or the like. The core network CN may include the SMF, PCF, UDM, and the like.

The management device 10 does not necessarily have to be a device that constitutes the core network CN. For example, it is assumed that the core network CN is a core network of wideband code division multiple access (W-CDMA) or code division multiple access 2000 (cdma2000). At this time, the management device 10 may be a device that functions as the radio network controller (RNC).

The management device 10 is connected to each of the plurality of base station devices 20. For example, in the case of the 5G system (5GS), there is an N2 reference point between the AMF and NG-RAN, and the AMF and NG-RAN are logically connected to each other via the NG interface.

The management device 10 manages the communication of the base station device 20. For example, the management device 10 manages the positions of the terminal devices 40 for each terminal device 40 in an area unit (for example, tracking area, RAN notification area) composed of a plurality of cells. The management device 10 may grasp and manage which base station device (or cell) the terminal device 40 is connected to, in a communication area of which base station device (or cell) the terminal device 40 exists, and the like for each terminal device 40.

Base Station Device

The base station device 20 is a wireless communication device that wirelessly communicates with the terminal device 40. The base station device 20 is a type of communication device. Moreover, the base station device 20 is a type of information processing device.

The base station device 20 may be, for example, a device corresponding to a wireless base station (base station, Node B, eNB, gNB, etc.) or a wireless access point (access point). When the base station device 20 is eNB, gNB, or the like, the base station device 20 may be referred to as 3GPP access. In addition, when the base station device 20 is a wireless access point (access point), the base station device 20 may be referred to as non-3GPP access (non-3GPP access). Alternatively, the base station device 20 may be a wireless relay station (relay node). Alternatively, the base station device 20 may be an optical extension device called remote radio head (RRH). Alternatively, the base station device 20 may be a receiving station device such as a field pickup unit (FPU). Alternatively, the base station device 20 may be an integrated access and backhaul (IAB) donor node or an IAB relay node that provides a wireless access line and a wireless backhaul line by time division multiplexing, frequency division multiplexing, or spatial division multiplexing.

When the base station device 20 is gNB, the base station device may be referred to as a combination of a gNB central unit (CU) and a gNB distributed unit (DU), or either of the gNB CU and the gNB DU. In the present embodiment, a base station of a wireless communication system may be referred to as base station device. The base station device 20 may be configured to be capable of wireless communication with another base station device 20. For example, when a plurality of the base station devices 20 is a combination of eNBs or a combination of eNB and gNB, the devices may be connected to each other by an X2 interface. Alternatively, when a plurality of the base station devices 20 is a combination of gNBs or a combination of eNB and gNB, the devices may be connected to each other by an Xn interface. Alternatively, when a plurality of the base station devices 20 is a combination of a gNB CU and a gNB DU, the devices may be connected to each other by an F1 interface. Messages and information (radio resource control (RRC) signaling or data center interconnection (DCI) information) described later may be communicated between the plurality of base station devices 20 (for example, via X2, Xn, and F1 interfaces).

The wireless access technology used by the base station device 20 may be a cellular communication technology or a wireless LAN technology. Needless to say, the wireless access technology used by the base station device 20 is not limited thereto and may be another wireless access technology. The wireless access technology used by the base station device 20 may be a low power wide area (LPWA) communication technology. Here, LPWA communication is communication conforming to the LPWA standards. Examples of the LPWA standards include ELTRES, ZETA, SIGFOX, LoRaWAN, narrow band (NB)-Iot and the like. Needless to say, the LPWA standards are not limited thereto and may be another LPWA standard. In addition, the wireless communication used by the base station device 20 may be wireless communication using millimeter waves. Moreover, the wireless communication used by the base station device 20 may be wireless communication using radio waves, or wireless communication using infrared rays or visible light (optical radio).

The base station device 20 may be capable of non-orthogonal multiple access (NOMA) communication with the terminal device 40. Here, NOMA communication refers to communication (transmission, reception, or both) using non-orthogonal resources. The base station device 20 may be configured to enable NOMA communication with another base station device 20.

The base station devices 20 may be able to communicate with each other via an interface between the base station device and the core network (for example, S1 interface). This interface may be wired or wireless. Moreover, the base station devices may be able to communicate with each other via an interface between the base station devices (for example, X2 interface, S1 interface, etc.). This interface may be wired or wireless.

The plurality of base station devices 20 may be able to communicate with each other via an interface between the base station device and the core network (for example, NG interface, S1 interface, etc.). This interface may be wired or wireless. Moreover, the base station devices may be able to communicate with each other via an interface between the base station devices (for example, Xn interface, X2 interface, etc.). This interface may be wired or wireless.

Moreover, each of the base station devices 20 may be composed of a set of a plurality of physical or logical devices. For example, in the present embodiment, the base station is classified into a plurality of devices of a baseband unit (BBU) and a radio unit (RU) and may be interpreted as an aggregate of the pluralities of these devices. In addition or alternatively, in the embodiments of the present disclosure, the base station may be either or both of the BBU and the RU. The BBU and the RU may be connected via a predetermined interface (for example, enhanced common public radio interface (eCPRI)). In addition or alternatively, the RU may be referred to as a remote radio unit (RRU) or a radio dot (RD). In addition or alternatively, the RU may correspond to a gNB-DU, which will be described later. In addition or alternatively, the BBU may correspond to gNB-CU, which will be described later. In addition or alternatively, the RU may be a device integrally formed with an antenna. An antenna of the base station (for example, an antenna formed integrally with the RU) may adopt an advanced antenna system and support multiple-input and multiple-output (MIMO) (for example, full dimension MIMO (FD-MIMO)) or beamforming. In the advanced antenna system, the antenna of the base station (for example, the antenna integrally formed with the RU) may include, for example, 64 transmitting antenna ports and 64 receiving antenna ports.

The plurality of base station devices 20 may be connected to each other. One or a plurality of the base station devices 20 may be included in a radio access network (RAN). That is, the base station may be simply referred to as RAN, RAN node, access network (AN), or AN node. The RAN in LTE is called enhanced universal terrestrial RAN (EUTRAN). The RAN in NR is called NGRAN. The RAN in W-CDMA (universal mobile telecommunications system (UMTS)) is called UTRAN.

An LTE base station may be referred to as evolved node B (eNodeB) or eNB. That is, the EUTRAN includes one or a plurality of eNodeBs (eNBs). In addition, the NR base station may be referred to as gNodeB or gNB. That is, the NGRAN includes one or a plurality of gNBs. Moreover, EUTRAN may include a gNB (en-gNB) connected to the core network (evolved packet core (EPC)) in the LTE communication system (encapsulated post script (EPS)). Similarly, the NGRAN may include an ng-eNB connected to the core network 5GC in the 5G communication system (5GS).

When the base station is a gNB, the base station may be referred to as a combination of the above-mentioned gNB central unit (CU) and gNB distributed unit (DU), or either of them. The gNB central unit (CU) hosts a plurality of upper layers (for example, RRC, service data adoption protocol (SDAP), and packet data coverage protocol (PDCP)) of the access stratum for communication with a UE. On the other hand, the gNB-DU hosts a plurality of lower layers (for example, radio link control (RLC), medium access control (MAC), and physical layer (PHY)) of the access stratum. That is, among the messages and information described later, RRC signaling (quasi-static notification) may be generated by the gNB CU, and data center interconnection (DCI) (dynamic notification) may be generated by the gNB-DU. Alternatively, among RRC configurations (quasi-static notifications), some configurations such as cell Group-Config information elements (IE) may be generated by the gNB-DU, and the remaining configurations may be generated by the gNB-CU. These configurations may be transmitted and received via the F1 interface.

Each of the base station devices 20 may be configured to be able to communicate with another base station device 20. For example, when a plurality of the base station devices 20 is a combination of eNBs or a combination of an eNB and an en-gNB, the base station devices 20 may be connected by the X2 interface. Moreover, when the plurality of base station devices 20 is a combination of gNBs or a combination of a gn-eNB and a gNB, the devices may be connected by the Xn interface. Moreover, when the plurality of base station devices 20 is a combination of a gNB central unit (CU) and a gNB distributed unit (DU), the devices may be connected by the F1 interface described above. Messages and information (RRC signaling or DCI information) may be communicated between a plurality of the base stations (e.g., via X2, Xn, or F1 interface).

Each of the base station devices 20 can be used, operated, and/or managed by various entities. For example, as an entity, a mobile network operator (MNO), a mobile virtual network operator (MVNO), a mobile virtual network enabler (MVNE), and a neutral host network (NHN) operator, an enterprise, an educational institution (school corporation, local government education committee, etc.), a real estate (building, condominium, etc.) manager, an individual, etc. can be assumed.

Needless to say, the entity of use, operation, and/or management of the base station device 20 is not limited thereto. The base station device 20 may be installed and/or operated by one business operator, or may be installed and/or operated by one individual. Needless to say, installation/operation entity of the base station device 20 is not limited thereto. For example, the base station device 20 may be jointly installed and operated by a plurality of businesses operators or a plurality of individuals. Alternatively, the base station device 20 may be shared equipment used by a plurality of business operators or a plurality of individuals. In this case, installation and/or operation of the equipment may be carried out by a third party different from the user.

The concept of the base station device (also referred to as base station) includes not only a donor base station, but also a relay base station (also referred to as relay station, relay station, relay base station, or relay station device). In addition, the concept of the base station includes not only a structure having the function of the base station, but also a device installed in a structure.

The structure is, for example, a building such as a high-rise building, a house, a steel tower, a station facility, an airport facility, a port facility, or a stadium. The concept of the structure includes not only a building, but also a non-building structure such as a tunnel, a bridge, a dam, a wall, and an iron pillar, and equipment such as a crane, a gate, and a windmill. In addition, the concept of the structure includes not only a structure on land (above ground in a narrow sense) or underground, but also a structure on water such as a pier and a mega float, and a structure underwater such as an ocean observation facility. The base station device can be rephrased as a processing device or an information processing device.

The base station device 20 may be a donor station or a relay station (relay station). Alternatively, the base station device 20 may be a fixed station or a mobile station. The mobile station is a wireless communication device (for example, a base station device) configured to be mobile. In this case, the base station device 20 may be a device installed on a mobile body or may be the mobile body itself. For example, a relay station device having mobility can be regarded as the base station device 20 as a mobile station. In addition, a device that is originally a mobile device such as a vehicle, a drone (aerial vehicle), and a smartphone and that is equipped with the functions of the base station device (at least some of the functions of the base station device) also corresponds to the base station device 20 as a mobile station.

Here, the mobile body may be a mobile terminal such as a smartphone or a mobile phone. Alternatively, the mobile body may be a mobile body (for example, a vehicle such as a car, a bicycle, a bus, a truck, a motorcycle, a train, a linear motor car, etc.) that moves on land (ground in a narrow sense), or a mobile body (for example, a subway) that moves underground (for example, in a tunnel).

Alternatively, the mobile body may be a mobile body that moves on water (for example, a ship such as a passenger ship, a cargo ship, a hovercraft, etc.), or a mobile body that moves underwater (for example, a submersible, a submarine, an unmanned submarine, etc.).

Alternatively, the mobile body may be a mobile body that moves in the atmosphere (for example, an aerial vehicle such as an airplane, an airship, or a drone), or a mobile body that moves outside the atmosphere (for example, an artificial satellite, a spacecraft, a space station or an artificial celestial body such as a probe). The mobile body that moves outside the atmosphere can be rephrased as a space mobile body.

Alternatively, the base station device 20 may be a ground base station device (ground station device) installed on ground. For example, the base station device 20 may be a base station device arranged on a structure on ground, or may be a base station device installed on a mobile body that moves on ground. More specifically, the base station device 20 may be an antenna installed in a structure such as a building and a signal processing device connected to the antenna. Needless to say, the base station device 20 may be a structure or the mobile body itself. "Ground" is not only on land (ground in a narrow sense), but also on ground in a broad sense including underground, on water, and in water. The base station device 20 is not limited to a ground base station device. The base station device 20 may be a non-ground base station device (non-ground station device) capable of floating in the air or in space. For example, the base station device 20 may be an aircraft station device or a satellite station device.

The aircraft station device is a wireless communication device capable of floating in the atmosphere (including the stratosphere) such as an aircraft. The aircraft station device may be a device mounted on an aircraft or the like, or may be the aircraft itself. The concept of the aircraft includes not only a heavy aircraft such as an airplane and a glider, but also a light aircraft such as a balloon and an airship. In addition, the concept of the aircraft includes not only a heavy aircraft and a light aircraft, but also a rotary-wing aircraft such as a helicopter and an autogyro. The aircraft station device (or an aircraft on which the aircraft station device is mounted) may be an unmanned aerial vehicle such as a drone (aerial vehicle). When the aircraft station device functions as a user equipment (UE), the aircraft station device may be an aerial UE.

The concept of the unmanned aerial vehicle also includes an unmanned aircraft system (UAS) and a tethered UAS. In addition, the concept of the unmanned aerial vehicle includes a light unmanned aerial vehicle system (lighter than air (LTA) UAS) and a heavy unmanned aerial vehicle system (heavier than air (HTA) UAS). In addition, the concept of the unmanned aerial vehicle also includes a high altitude UAS platform (HAP).

A satellite station device is a wireless communication device capable of floating outside the atmosphere. The satellite station device may be a device mounted on a space mobile body such as an artificial satellite, or may be the space mobile body itself. A satellite that serves as the satellite station device may be any of a low earth orbiting (LEO) satellite, a medium earth orbiting (MEO) satellite, a geostationary earth orbiting (GEO) satellite, and a highly elliptical orbiting (HEO) satellite. Needless to say, the satellite station device may be a device mounted on a low earth orbiting satellite, a medium earth orbiting satellite, a geostationary earth satellite, or a highly elliptical orbiting satellite.

The size of the coverage of the base station device 20 may be as large as a macro cell or as small as a pico cell. Needless to say, the size of the coverage of the base station device 20 may be extremely small, such as a femtocell. In addition, the base station device 20 may have a beamforming capability. In this case, the base station device 20 may form a cell or a service area for each beam.

The cell provided by the base station device 20 is called a serving cell. The serving cell may include a primary cell (PCell) and a secondary cell (SCell). When dual connectivity is provided to a UE (e.g., the terminal device 40), a PCell and SCell(s) provided by a master node (MN) are called a master cell group. Examples of dual connectivity include EUTRA-EUTRA dual connectivity, EUTRA-NR dual connectivity (ENDC), EUTRA-NR dual connectivity with 5GC, NR-EUTRA dual connectivity (NEDC), and NR-NR dual connectivity.

Moreover, the serving cell may include a primary secondary cell (PSCell or primary secondary cell group (SCG) cell). That is, when dual connectivity is provided to the UE, the PSCell(s) and SCell(s) provided by a secondary node (SN) are called a secondary cell group (SCG).

In one cell, one downlink component carrier and one uplink component carrier may be associated with each. In addition, the system bandwidth corresponding to one cell may be divided into a plurality of bandwidth parts (BWPs). In this case, one or a plurality of BWPs may be set in the UE and, one BWP may be used by the UE as an active BWP. In addition, radio resources (for example, frequency band, numerology (subcarrier spacing), slot format (slot configuration)) that can be used by the terminal device 40 may differ for each cell, each component carrier, or each BWP. Moreover, one base station device may provide a plurality of cells.

Terminal Device

The terminal device 40 is a wireless communication device that wirelessly communicates with the base station device 20. The terminal device 40 is, for example, a mobile phone, a smart device (smartphone or tablet), a personal digital assistant (PDA), or a personal computer. Alternatively, the terminal device 40 may be a device such as a commercial camera provided with a communication function, or may be a motorcycle, a mobile relay vehicle, or the like equipped with a communication device such as a field pickup unit (FPU). Alternatively, the terminal device 40 may be a machine to machine (M2M) device or an Internet of things (IoT) device. The terminal device 40 is sometimes referred to as, for example, machine type communication (MTC) UE, narrow band (NB)-IoT UE, and category M (Cat.M) UE. Alternatively, the terminal device may be referred to as mobile station (MS) or wireless transmission reception unit (WTRU).

In addition, the terminal device 40 may be capable of side link communication with another terminal device 40. The terminal device 40 may be able to use an automatic retransmission technique such as a hybrid automatic repeat request (HARQ) when performing side link communication. The terminal device 40 may be capable of NOMA communication with the base station device 20. The terminal device 40 may also be capable of NOMA communication in communication (side link) with another terminal device 40. In addition, the terminal device 40 may be capable of LPWA communication with another communication device (for example, the base station device 20 and another terminal device 40). In addition, the wireless communication used by the terminal device 40 may be wireless communication using millimeter waves. The wireless communication (including side link communication) used by the terminal device 40 may be wireless communication using radio waves or wireless communication using infrared rays or visible light (optical radio).

Alternatively, the terminal device 40 may be a mobile device. Here, the mobile device is a mobile wireless communication device. In this case, the terminal device 40 may be a wireless communication device installed on a mobile body or may be the mobile body itself. For example, the terminal device 40 may be a vehicle moving on a road such as an automobile, a bus, a truck, or a motorcycle, or a wireless communication device mounted on the vehicle. The mobile body may be a mobile terminal, or may be a mobile body that moves on land (ground in a narrow sense), in the ground, on water, or in water. Alternatively, the mobile body may be a mobile body such as a drone (aerial UE) or a helicopter that moves in the atmosphere, or a mobile body that moves outside the atmosphere such as an artificial satellite.

The terminal device 40 may connect to a plurality of base station devices or a plurality of cells at the same time to perform communication. For example, if one base station device can provide a plurality of cells, the terminal device 40 can perform carrier aggregation by using one cell as a PCell and other cells as SCells. In addition, when each of a plurality of the base station devices 20 can provide one or a plurality of cells, the terminal device 40 can realize dual connectivity (DC) by using one or a plurality of cells managed by one base station device (MN (e.g., MeNB or MgNB)) as a PCell, or a PCell and SCell(s) and using one or a plurality of cells managed by another base station device (SN (e.g., SeNB or SgNB)) as a PCell, or a PCell and SCell(s). DC may be referred to as multi connectivity (MC).

When the communication area is supported via cells of different base station devices 20 (a plurality of cells having different cell identifiers or the same cell identifiers), it is possible to bundle the plurality of cells and perform communication between the base station devices 20 and the terminal device 40 by carrier aggregation (CA) technology, dual connectivity (DC) technology, and multi-connectivity (MC) technology. Alternatively, the terminal device 40 and the plurality of base station devices 20 can communicate with each other via the cells of the different base station devices 20 by coordinated multi-point transmission and reception (CoMP) technology.

The terminal device 40 does not necessarily have to be a device directly used by a person. The terminal device 40 may be a sensor installed in a machine or the like in a factory, such as so-called machine type communication (MTC). Alternatively, the terminal device 40 may be a machine to machine (M2M) device or an Internet of things (IoT) device. Alternatively, the terminal device 40 may be a device having a relay communication function, as represented by device to device (D2D) and vehicle to everything (V2X). Alternatively, the terminal device 40 may be a device called client premises equipment (CPE) used in a wireless backhaul or the like.

Hereinafter, the configuration of each device constituting the communication system 1 according to the embodiment will be specifically described. The configuration of each device shown below is merely an example. The configuration of each device may be different from the configuration below.

2-2. Configuration of Management Device

Figure 7:
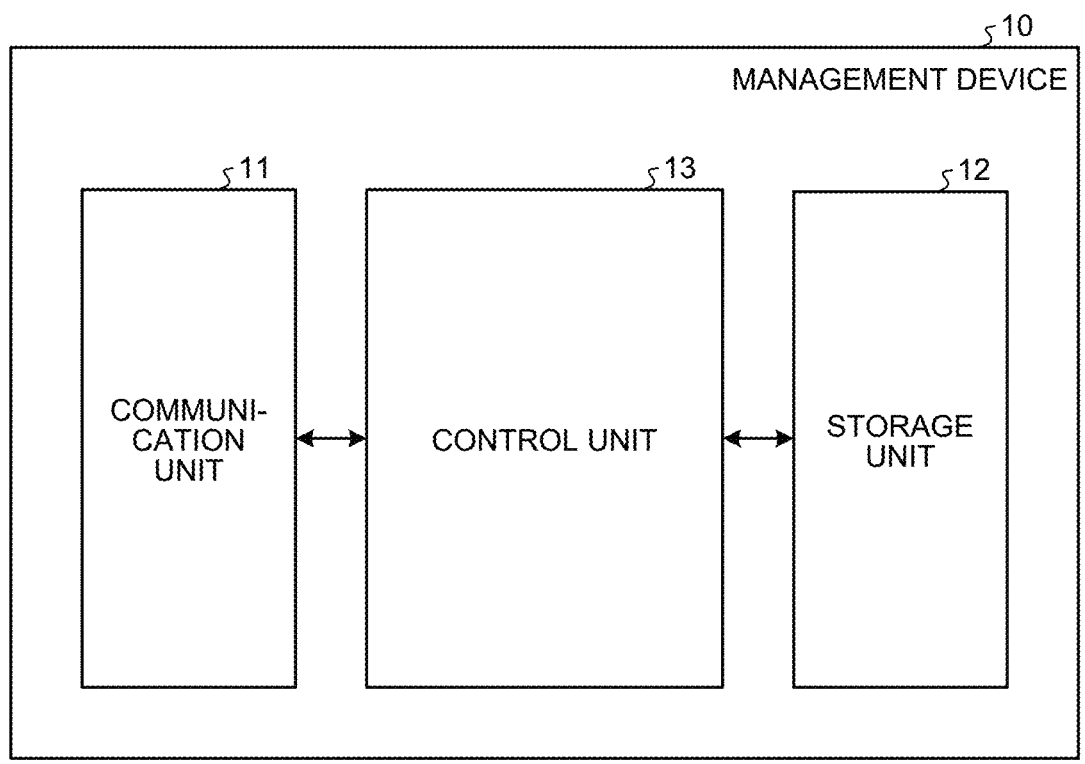
FIG. 7 is a diagram illustrating a configuration example of a management device according to the first embodiment.

FIG. 7 is a diagram illustrating a configuration example of the management device 10 according to the first embodiment. Each of the management devices 10 is a device that manages a wireless network. The management device 10 includes a communication unit 11, a storage unit 12, and a control unit 13. The configuration illustrated in FIG. 7 is a functional configuration, and a hardware configuration may be different from this configuration. In addition, functions of the management device 10 may be distributed in a plurality of physically separated configurations and mounted. For example, the management device 10 may be composed of a plurality of server devices.

The communication unit 11 is a communication interface for communicating with another device. The communication unit 11 may be a network interface or a device connection interface. For example, the communication unit 11 may be a local area network (LAN) interface such as a network interface card (NIC), or a universal serial bus (USB) interface composed of a USB host controller, a USB port and the like. In addition, the communication unit 11 may be a wired interface or a wireless interface. The communication unit 11 functions as a communication means of the management device 10. The communication unit 11 communicates with the base station device 20 under the control of the control unit 13.

The storage unit 12 is a data readable/writable storage device such as a dynamic random access memory (DRAM), a static random access memory (SRAM), a flash memory, and a hard disk. The storage unit 12 functions as a storage means for the management device 10. The storage unit 12 stores, for example, the connection state of the terminal device 40. For example, the storage unit 12 stores the radio resource control (RRC) state and the ECM (EPS connection management) state of the terminal device 40. The storage unit 12 may also function as a home memory for storing position information of the terminal device 40.

The control unit 13 is a controller that controls each unit of the management device 10. The control unit 13 is realized by, for example, a processor such as a central processing unit (CPU) or a micro processing unit (MPU). For example, the control unit 13 is realized by a processor executing various programs stored in a storage device inside the management device 10 using a random access memory (RAM) or the like as a work area. The control unit 13 may be realized by an integrated circuit such as an application specific integrated circuit (ASIC) or a field programmable gate array (FPGA). A CPU, an MPU, an ASIC, and an FPGA can all be considered a controller.

2-3. Configuration of Base Station Device

Figure 8:
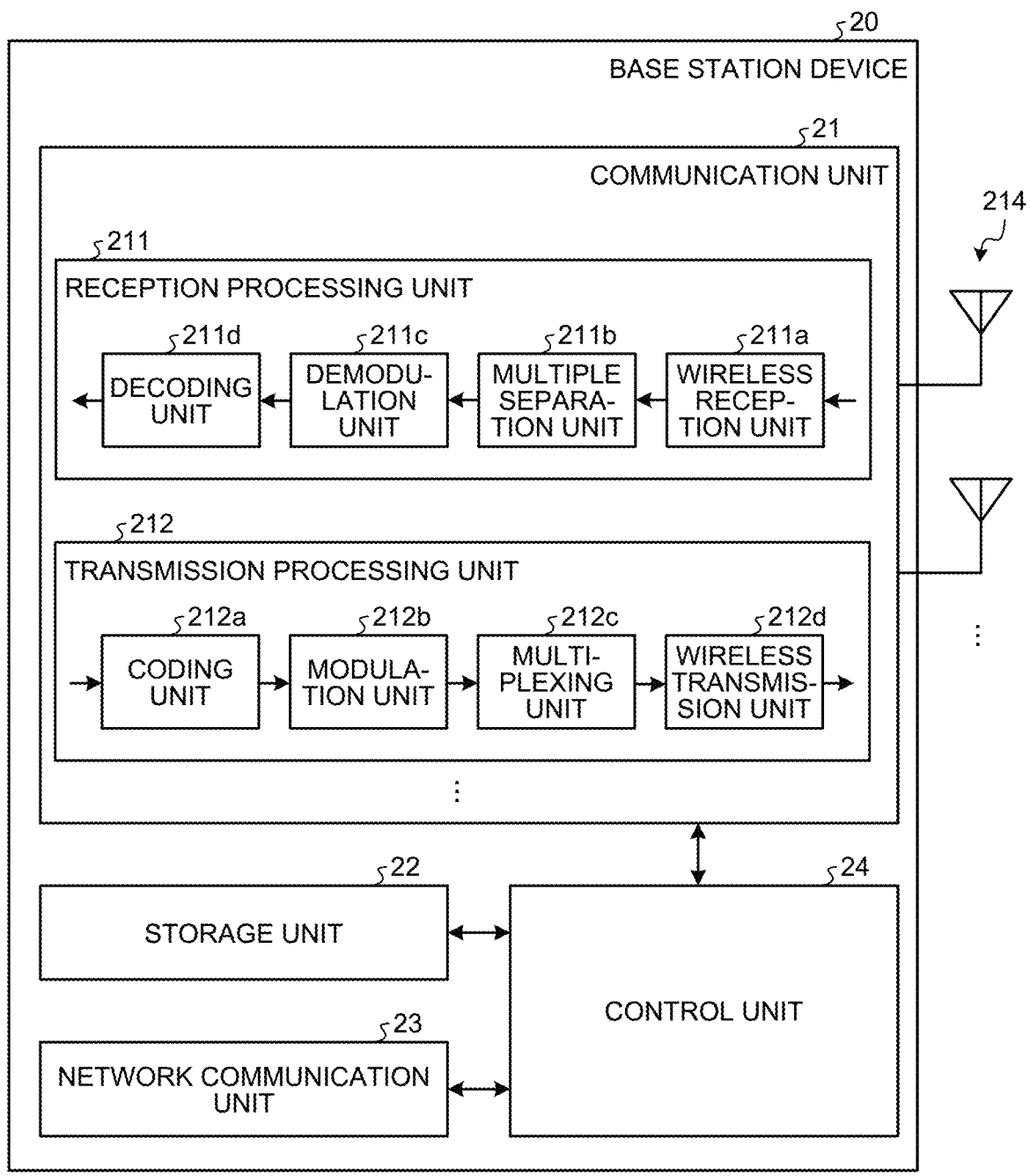
FIG. 8 is a diagram illustrating a configuration example of a base station device according to the first embodiment.

Next, the configuration of the base station device 20 will be described. FIG. 8 is a diagram illustrating a configuration example of the base station device 20 according to the first embodiment. The base station device 20 can simultaneously perform data transmission and data reception using the same band. For example, the base station device 20 can perform in-band full-duplex communication with another wireless communication device such as the terminal device 40. The base station device 20 may be capable of NOMA communication with another wireless communication device.

The base station device 20 includes a communication unit 21, a storage unit 22, a network communication unit 23, and a control unit 24. The configuration illustrated in FIG. 8 is a functional configuration, and a hardware configuration may be different from this configuration. In addition, functions of the base station device 20 may be distributed in a plurality of physically separated configurations and mounted.

The communication unit 21 is a signal processing unit for wireless communication with another wireless communication device (for example, the terminal device 40 and another base station device 20). The communication unit 21 can simultaneously perform data transmission and data reception using the same band. For example, the base station device 20 is capable of in-band full-duplex communication with another communication device such as the terminal device 40. The communication unit 21 operates according to the control of the control unit 24. The communication unit 21 corresponds to one or a plurality of wireless access methods. For example, the communication unit 21 corresponds to both NR and LTE. The communication unit 21 may correspond to W-CDMA or cdma2000 in addition to NR and LTE. In addition, the communication unit 21 may correspond to communication using NOMA.

The communication unit 21 includes a reception processing unit 211, a transmission processing unit 212, and an antenna 214. The communication unit 21 may include pluralities of the reception processing units 211, the transmission processing units 212, and the antennas 214. When the communication unit 21 corresponds to a plurality of wireless access methods, each unit of the communication unit 21 may be individually configured for each wireless access method. For example, each of the reception processing units 211 and the transmission processing units 212 may be individually configured for LTE and NR.

The reception processing unit 211 processes an uplink signal received via the antennas 214. The reception processing unit 211 includes a wireless reception unit 211a, a multiple separation unit 211b, a demodulation unit 211c, and a decoding unit 211d.

The wireless reception unit 211a, to uplink signals, performs down-conversion, removes unnecessary frequency components, controls the amplification level, performs orthogonal demodulation, performs conversion into to digital signals, removes guard intervals (cyclic prefix), and extracts frequency domain signals by a fast Fourier transform. The multiple separation unit 211b separates uplink channels such as physical uplink shared channels (PUSCHs) and physical uplink control channels (PUCCHs) and uplink reference signals from signals output from the wireless reception unit 211a. The demodulation unit 211c demodulates a received signal for a modulation symbol of an uplink channel by using a modulation method such as binary phase shift keying (BPSK) or quadrature phase shift keying (QPSK). The modulation method used by the demodulation unit 211c may be 16 quadrature amplitude modulation (QAM), 64QAM, or 256QAM. In this case, signal points on a constellation do not necessarily have to be equidistant. The constellation may be a non-uniform constellation (NUC). The decoding unit 211d performs decoding processing on coded bits of the demodulated uplink channel. The decoded uplink data and uplink control information are output to the control unit 24.

The transmission processing unit 212 performs transmission processing of downlink control information and downlink data. The transmission processing unit 212 includes a coding unit 212a, a modulation unit 212b, a multiplexing unit 212c, and a wireless transmission unit 212d.

The coding unit 212a encodes downlink control information and downlink data input from the control unit 24 by using a coding method such as block coding, convolutional coding, or turbo coding. The coding unit 212a may perform encoding by a polar code or a low density parity check code (LDPC). The modulation unit 212b modulates coded bits output from the coding unit 212a by a predetermined modulation method such as BPSK, QPSK, 16QAM, 64QAM, 256QAM or the like. In this case, signal points on a constellation do not necessarily have to be equidistant. The constellation may be a non-uniform constellation. The multiplexing unit 212c multiplexes modulation symbols of each channel and downlink reference signals and arranges them in a predetermined resource element. The wireless transmission unit 212d performs various signal processing on signals from the multiplexing unit 212c. For example, the wireless transmission unit 212d performs conversion into a time domain by inverse fast Fourier transform, adds a guard interval (cyclic prefix), generates a baseband digital signal, performs conversion into analog signals, performs orthogonal modulation, performs up-conversion, removes excessive frequency components, and amplifies power. Signals generated by the transmission processing unit 212 are transmitted from the antennas 214.

Here, each of the antennas 214 will be described. At a high frequency, in order to compensate for a propagation loss, it is necessary to perform beamforming to narrow a direction in which radio waves are transmitted by giving directivity to the antenna. In the case of a fully digital system, it is necessary to have the same number of antenna weights as the antenna elements in a digital domain in order to control the directivity of the antenna. The antenna weights here are weights for controlling the amplitude and phase. However, when controlling the amplitude and phase in the digital domain, the digital circuit becomes large. For this reason, a phase shifter, which is an antenna weight that can control only the phase, is generally used in the analog domain. Such a configuration is called analog digital hybrid antenna architecture. The antenna weight in the digital domain realizes the antenna weight before inverse fast Fourier transform (IFFT) in the frequency domain when the orthogonal frequency division multiplexing (OFDM) modulation method is used, that is, at the time of transmission. At the time of reception, the antenna weight is realized after fast Fourier transform (FFT). Therefore, when the antenna weights in the digital domain are realized in the frequency domain, beams can be directed in different directions using resources of different frequencies even at the same time. On the other hand, since the antenna weights realized in the analog domain always control the antenna weights in a time domain, beams can be directed only in the same direction over the entire frequency domain at the same time.

When performing controlling in the digital domain, the digital circuit becomes large and the cost becomes high. Therefore, basically, beam processing in the analog domain is desirable in terms of cost, and it is not desirable for both the terminal and the base station to direct the beams in different directions at the same time.

Configuration of Antenna

Figure 9:
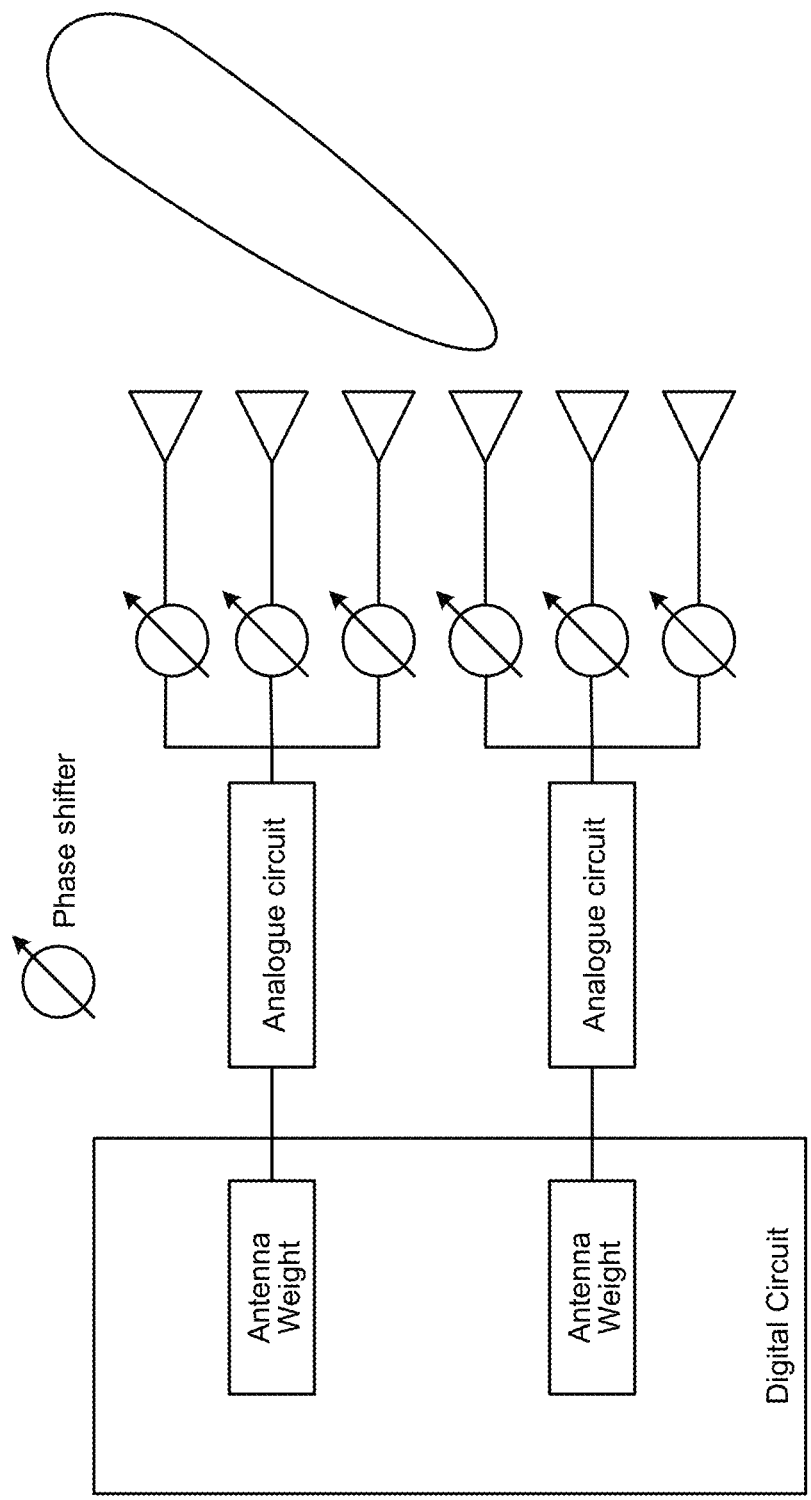
FIG. 9 is a diagram schematically illustrating a configuration of an antenna.

FIG. 9 is a diagram schematically illustrating a configuration of the antenna. In FIG. 9, phase shifters of three analog domains are connected to the weight of one digital domain. This set is arranged together as an antenna panel. In the example of FIG. 9, the antenna panel is composed of three antenna elements, and there are two antenna panels. The number of antenna elements and the number of antenna panels are examples, and are not limited thereto. Normally, one antenna panel cannot produce beams in different directions at the same time using different frequencies. However, with two antenna panels, it is possible to produce beams in different directions at the same time. This antenna panel configuration is used for both the antennas on a side of the base station device 20 and a side of the terminal device 40.

The description will be returned to FIG. 8. The storage unit 22 is a storage device that can read and write data such as a DRAM, an SRAM, a flash memory, and a hard disk. The storage unit 22 functions as a storage means for the base station device 20.

The network communication unit 23 is a communication interface for communicating with a node (for example, the management device 10) located at a higher level on the network. For example, the network communication unit 23 is a LAN interface such as an NIC. The network communication unit 23 may be a wired interface or a wireless interface. The network communication unit 23 functions as a network communication means of the base station device 20.

The control unit 24 is a controller that controls each unit of the base station device 20. The control unit 24 is realized by, for example, a processor (hardware processor) such as a central processing unit (CPU) or a micro processing unit (MPU). For example, the control unit 24 is realized by a processor executing various programs stored in a storage device inside the base station device 20 using a random access memory (RAM) or the like as a work area. The control unit 24 may be realized by an integrated circuit such as an application specific integrated circuit (ASIC) or a field programmable gate array (FPGA). A CPU, an MPU, an ASIC, and an FPGA can all be considered a controller.

2-4. Configuration of Terminal Device

Figure 10:
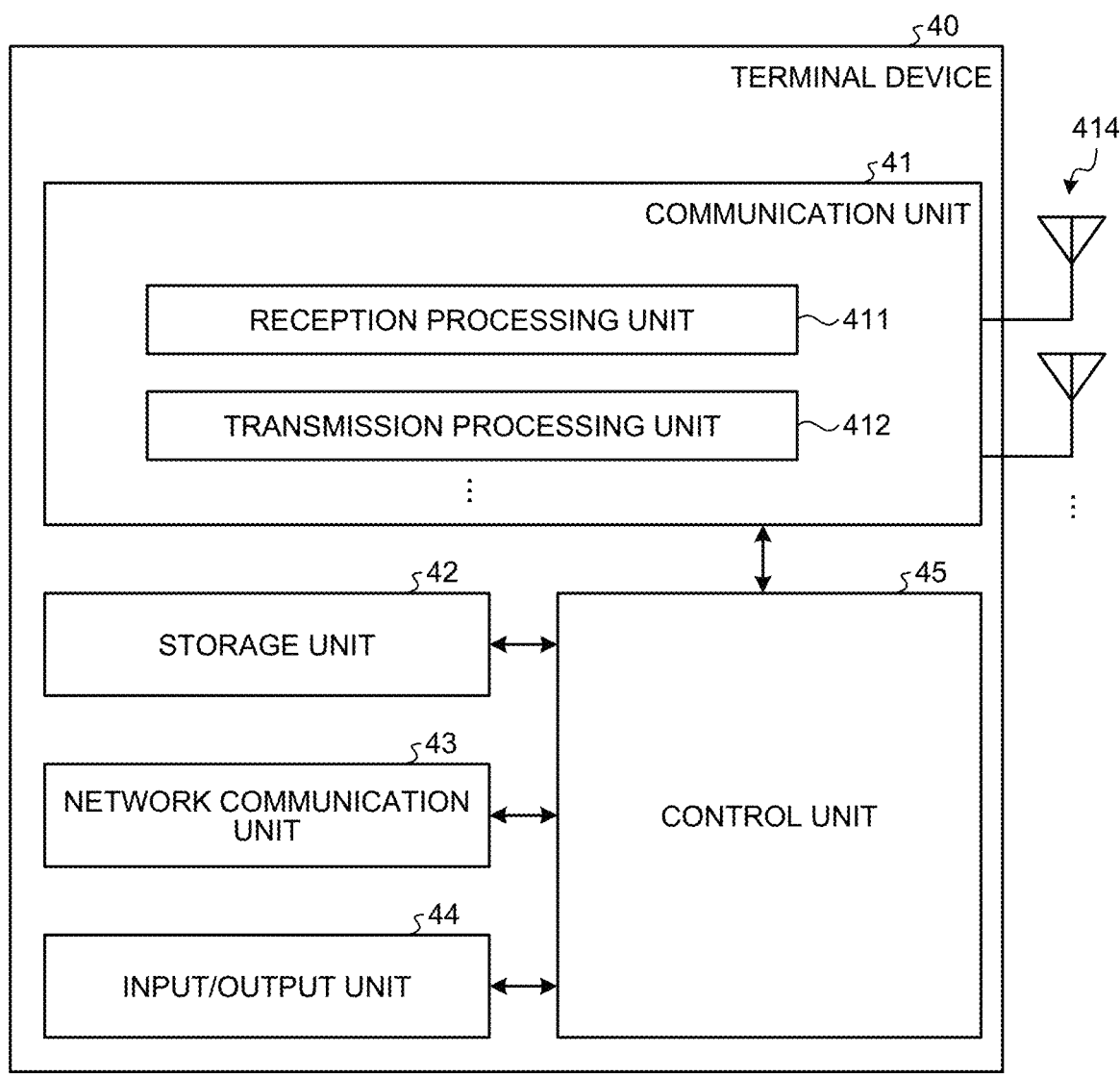
FIG. 10 is a diagram illustrating a configuration example of a terminal device according to the first embodiment.

Next, the configuration of the terminal device 40 will be described. FIG. 10 is a diagram illustrating a configuration example of the terminal device 40 according to the first embodiment. The terminal device 40 can simultaneously perform data transmission and data reception using the same band. For example, the terminal device 40 can perform in-band full-duplex communication with another wireless communication device such as the base station device 20. The terminal device 40 may be capable of NOMA communication with another wireless communication device.

The terminal device 40 includes a communication unit 41, a storage unit 42, a network communication unit 43, an input/output unit 44, and a control unit 45. The configuration illustrated in FIG. 10 is a functional configuration, and the hardware configuration may be different from this configuration. In addition, the functions of the terminal device 40 may be distributed in a plurality of physically separated configurations and mounted. In the configuration of the terminal device 40, the network communication unit 43 and the input/output unit 44 do not have to be essential components.

The communication unit 41 is a signal processing unit for wireless communication with another wireless communication device (for example, the base station device 20 and another terminal device 40). The communication unit 41 can simultaneously perform data transmission and data reception using the same band. For example, the communication unit 41 can perform in-band full-duplex communication with another communication device such as the base station device 20 and the terminal device 40. The communication unit 41 operates according to the control of the control unit 45. The communication unit 41 corresponds to one or a plurality of wireless access methods. For example, the communication unit 41 corresponds to both NR and LTE. The communication unit 41 may correspond to W-CDMA and cdma2000 in addition to NR and LTE. In addition, the communication unit 41 may correspond to communication using NOMA.

The communication unit 41 includes a reception processing unit 411, a transmission processing unit 412, and an antenna 414. The communication unit 41 may include pluralities of the reception processing units 411, the transmission processing units 412, and the antennas 414. The configurations of the communication unit 41, each of the reception processing units 411, each of the transmission processing units 412, and each of the antennas 414 are the same as those of the communication unit 21, the reception processing unit 211, the transmission processing unit 212, and the antenna 214 of the base station device 20.

The storage unit 42 is a storage device that can read and write data such as a DRAM, an SRAM, a flash memory, and a hard disk. The storage unit 42 functions as a storage means for the terminal device 40. The storage unit 42 stores information regarding the priority of beam sweeping. The priority of beam sweeping will be described in detail later.

The network communication unit 43 is a communication interface for communicating with a node located at a higher level on the network. For example, the network communication unit 43 is a LAN interface such as an NIC. The network communication unit 43 may be a wired interface or a wireless interface. The network communication unit 43 functions as a network communication means of the terminal device 40. The network communication unit 43 communicates with another device according to the control of the control unit 45.

The input/output unit 44 is a user interface for exchanging information with the user. For example, the input/output unit 44 is an operation device for the user to perform various operations such as a keyboard, a mouse, operation keys, and a touch panel. Alternatively, the input/output unit 44 is a display device such as a liquid crystal display or an organic electroluminescence (EL) display. The input/output unit 44 may be an audio device such as a speaker or a buzzer. Alternatively, the input/output unit 44 may be a lighting device such as a light emitting diode (LED) lamp. The input/output unit 44 functions as an input/output means (input means, output means, operation means, or notification means) of the terminal device 40.

The control unit 45 is a controller that controls each unit of the terminal device 40. The control unit 45 is realized by, for example, a processor (hardware processor) such as a CPU or an MPU. For example, the control unit 45 is realized by a processor executing various programs stored in a storage device inside the terminal device 40 using an RAM or the like as a work area. The control unit 45 may be realized by an integrated circuit such as an ASIC or an FPGA. A CPU, an MPU, an ASIC, and an FPGA can all be considered a controller.

2-5. Operation of Communication System

The configuration of the communication system 1 has been described above. Next, operation of the communication system 1 will be described. First, the synchronization signal will be described.

Details of Synchronization Signal

As described above, when the terminal device 40 first connects to the base station device 20, the terminal device 40 needs to connect to the base station device 20 using random access which uses a frequency and time resources (uplink) and may cause a transmission packet to collide with another terminal device 40.

There are 64 different preambles that the terminal device 40 (UE) transmits when connecting using random access, and the preambles are assigned to each random access occasion. Therefore, when the terminal device 40, which determines that the same transmitting beam of the base station device 20 is good, transmits (reports) a preamble using the same random access occasion, if a different preamble is used, determination is made while the preambles are separated on the base station device 20 side.

The random access occasion, that is, a range of uplink (UL) resources to which the terminal device 40 can transmit the preamble is notified by system information provided by the base station device 20. The base station device 20 notifies the terminal device 40 of the frequency and time resources of the random access occasion. There is a one-to-one relationship between an SSB and a random access occasion. When receiving the resources of the random access occasion corresponding to the SSB, the base station device 20, which directs the transmitting beam in the direction of the SSB, receives the resources using the receiving beam, which is oriented in the same direction as the transmitting beam.

Figure 11:
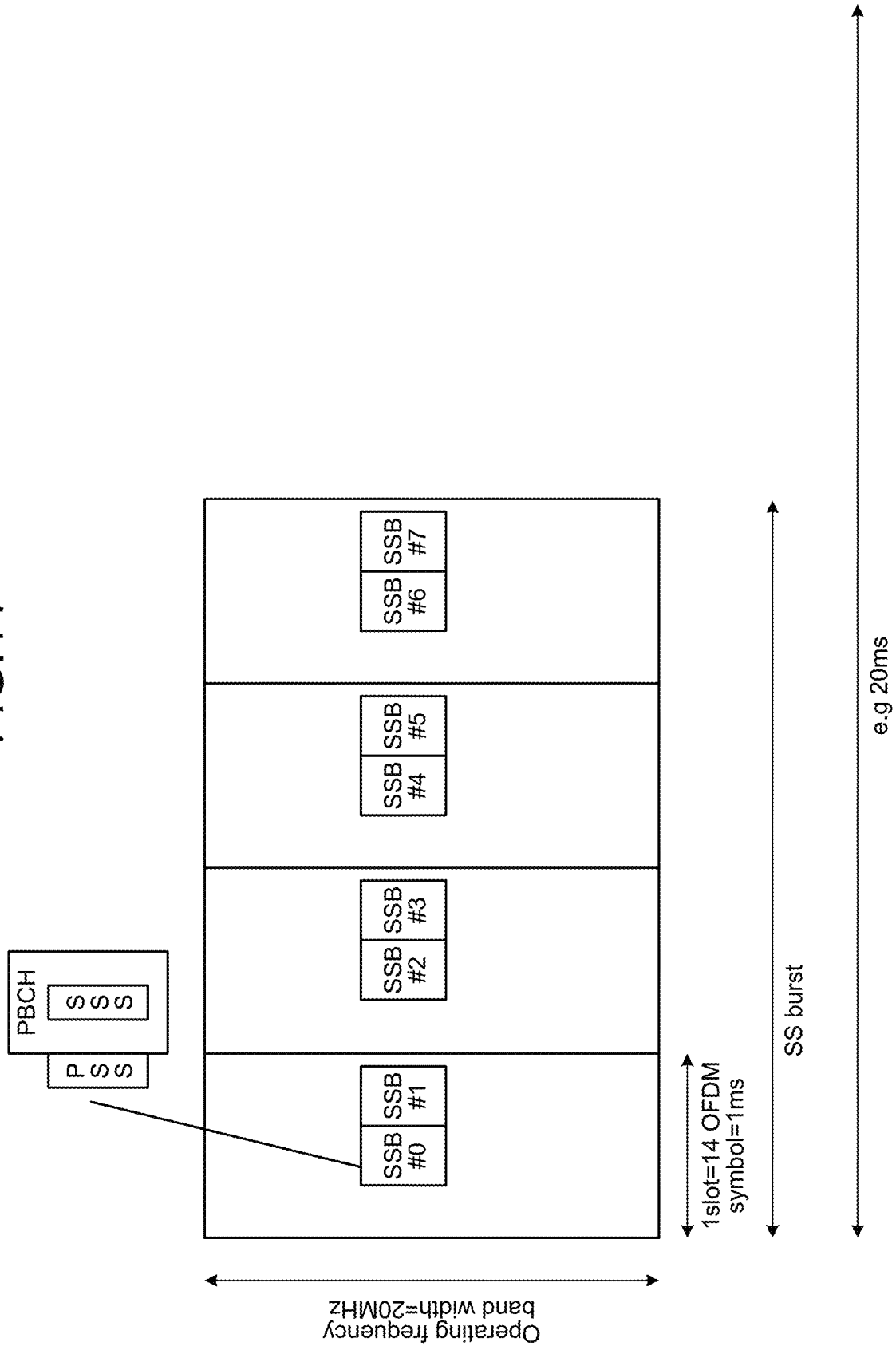
FIG. 11 is a diagram for explaining a synchronization signal.

The synchronization signal will be described. FIG. 11 is a diagram illustrating the synchronization signal. As illustrated in FIG. 11, the synchronization signal is a signal that periodically transmits a synchronization signal block (SSB) burst composed of a plurality of beamformed elements called SSBs. An SSB includes sequence called primary synchronization signal (PSS) and secondary synchronization signal (SSS) used for the synchronization signal, and a physical broadcast channel (PBCH). The PBCH includes system information (e.g., master information). The PSS and the SSS are used for at least synchronization in a time axis-direction and are associated with a physical cell identifier. Each SSB is transmitted using a beam in a different direction. Therefore, the terminal device 40 receives an SSB facing the direction of the terminal device 40 to perform synchronization.

Here, when a beamformed synchronization signal is transmitted at a high frequency (for example, 100 GHz), in order for the signal to reach the terminal device 40 far from the base station device 20, the beam width with respect to the transmission direction needs to be narrowed and sharpened. When the beam width is narrowed, it is necessary to perform beam sweeping using a large number of beams in order to cover a certain angle direction. Since this operation uses a large amount of frequency and time resources, the overhead of the downlink frequency and time resources for transmission from the base station becomes large, and the beams cannot be operated efficiently.

Since the terminal device 40, which is close to the base station device 20, has a small propagation loss, radio waves can reach even if the beams are not sharp. On the other hand, since the terminal device 40 far from the base station device 20 has a large propagation loss, it is necessary to sharpen the beams, and sharpening the beams increases the number of beams required for beam sweeping.

Therefore, the base station device 20 performs a plurality of types of beam sweeping. For example, the base station device 20 prepares two types of beam sweeping having different frequency bands and the number of beams for an area close to the base station and an area far from the base station in the same area and performs the two types of beam sweeping in the same cell or in the same BWP. For example, the base station device 20 performs first beam sweeping having a high frequency band and a large number of beams and second beam sweeping having a low frequency band and a small number of beams. The plurality of types of beam sweeping may be performed on different physical cell IDs (PCIs), that is, different cells, or may be performed on the same PCI, that is, the same cell. If the configurations of the plurality of types of beam sweeping are different in frequency and time resources, it is possible to distinguish between the plurality of types of beam sweeping. The plurality of types of beam sweeping is desirably transmitted from the same base station device 20. However, the plurality of types of beam sweeping may be transmitted from different base station devices 20. Of the two types of beam sweeping, at least the second beam sweeping is transmitted from the base station device 20.

FIG. 12A to 12C are diagrams illustrating examples of the first beam sweeping and the second beam sweeping. The first beam sweeping narrows beams by beamforming and sweeps 64 beams. The second beam sweeping, in which rough beams that are not narrowed as compared with the beams of the first beam sweeping, sweeps eight beams. The first beam sweeping reaches a distant area. In FIG. 12A, the base station device 20 provides such a plurality of types of beam sweeping in the same cell and in the same BWP. In FIG. 12B, the base station device 20 provides such a plurality of types of beam sweeping in the same cell and in different BWPs. In FIG. 12C, the base station device 20 provides such a plurality of types of beam sweeping in different cells.

For example, as illustrated in FIG. 12A, when the plurality of types of beam sweeping is performed in the same PCI and the same BWP, the base station device 20 prolongs the cycle of beam sweeping in a distant area among the plurality of types of beam sweeping. For example, the base station device 20 makes the cycle of the first beam sweeping, in which the beams are narrowed, longer than the cycle of the second beam sweeping, in which the beams are wide. For example, the cycle of the first beam sweeping, in which the beams are narrowed, is set to an integral multiple of the cycle of the second beam sweeping, in which the beams are wide. Since the first beam sweeping has a large number of beams, prolonging the cycle makes it possible to reduce the overhead of the frequency and time resources.

Figure 13:
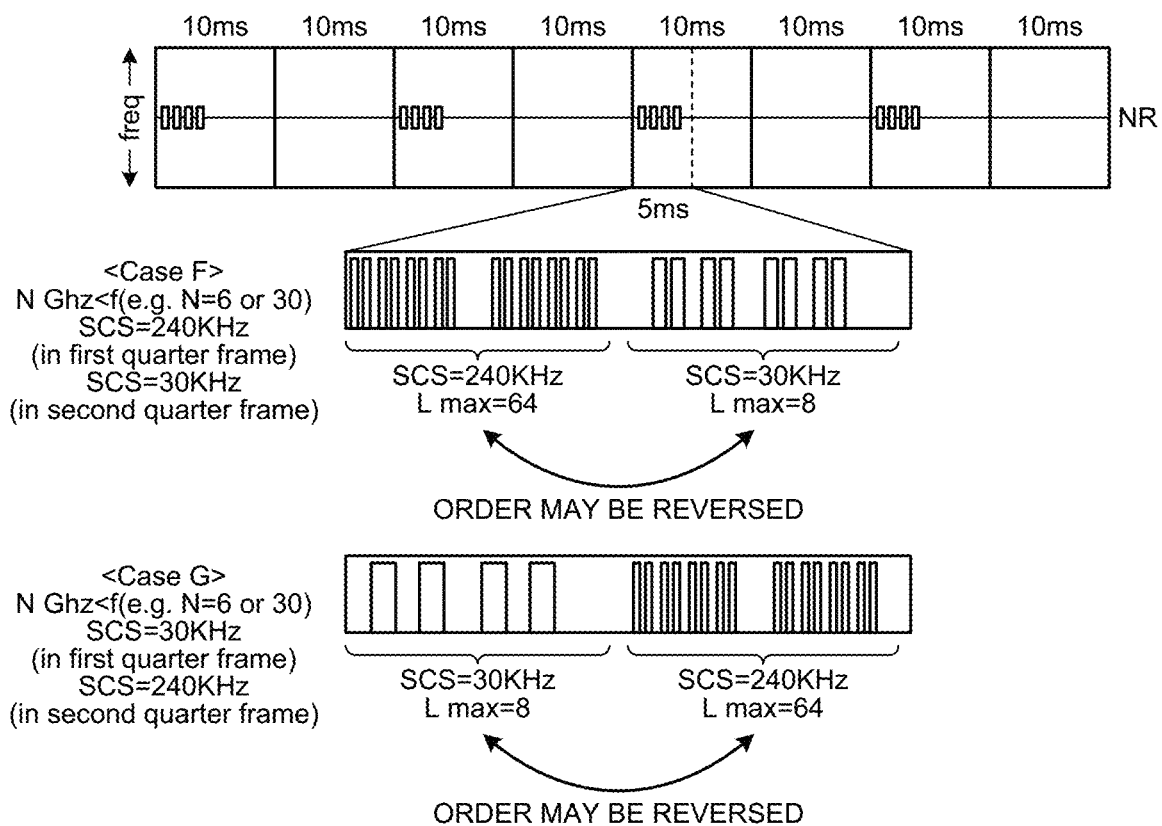
FIG. 13 is a diagram illustrating an SSB transmission pattern according to the first embodiment.

Here, SSB transmission patterns of the first beam sweeping and the second beam sweeping will be described. FIG. 13 is a diagram illustrating an SSB transmission pattern of the first embodiment. For example, cases F and G illustrated in FIG. 13 are introduced as new SSB transmission patterns for the first beam sweeping and the second beam sweeping. In the cases F and G illustrated in FIG. 13, at the same frequency (e.g., same BWP or same resource blocks) and the same time interval (e.g., half frame 5 ms, one SS Burst), two SSB groups, in which Lmaxes (and incidentally SCS) are different (i.e., the first beam sweeping and the second beam sweeping), are transmitted.

In the case F in FIG. 13, half frame 5 ms (e.g., one SS Burst) is divided into two quarter frames, and the number of SSBs transmitted differs between the first quarter frame and the second quarter frame. Moreover, the subcarrier spacing (SCS) may differ between the first quarter frame and the second quarter frame. For example, in the case F, the SSB group with SCS of 240 KHz and Lmax=64 is included in the first quarter frame, and the SSB group with SCS of 30 KHz and Lmax=8 is included in the second quarter frame. That is, one half frame 5 ms (e.g., one SS Burst) includes two SSB groups with different Lmaxes (and incidentally SCS). The example of the case F is not limited thereto. For example, in the case F, the order of the quarter frames may be reversed. An example of reversing the order of the case F is shown as the case G.

Moreover, as another case (hereinafter referred to as a case F'), either the case D or E may be transmitted in 5 ms of the first half frame, and any of the cases A to C may be transmitted in 5 ms of the second half frame. In this case as well, the order of the quarter frames may be reversed. A case G' is set to a transmission pattern in which the order of the case F' is reversed. In this case, the pattern is not established unless the cycle is 10 ms or more.

Moreover, as another case (hereinafter referred to as a case F"), either the case D or E may be transmitted in the first half frame 5 ms of the first frame, or any of the cases A to C may be transmitted at the second half frame 5 ms of the second frame. A case G" is set to a transmission pattern in which the order of the case F" is reversed. In this case, the pattern is not established unless the cycle is 20 ms or more.

The terminal device 40 acquires beam configurations of the plurality of types of beam sweeping from the base station device 20 (at least one of the beam configurations of the plurality of types of beam sweeping is specified in advance by a standard or the like), and based on the priority among the plurality of types of beam sweeping, a preferred beam is selected and reported to the base station device 20. For example, the terminal device 40 acquires the beam configurations of (at least one of) the first beam sweeping and the second beam sweeping from the base station device 20, selects a preferred beam based on the priority between the plurality of types of beam sweeping and reports the beam to base station device 20.

The priority may be preset in the terminal device 40 by a standard or the like, or may be notified from the base station device 20 to the terminal device 40 at the time of initial connection, and other cells (CCs) that are being connected may be used from the base station device 20 to perform setting in the terminal device 40.

The terminal device 40 that is close to the base station device 20 can observe the plurality of types of beam sweeping, but it is preferable to find the optimum beam from beam sweeping of wide beams having a short cycle. The terminal device 40 that is close to the base station device 20 can contribute to simplification of processing related to beam management by using beams that are wide and have a short cycle.

When the priority is preset in the terminal device 40, the following may be performed. The highest FR and band of NR defined by the current standard are FR2 and the frequency band n261 included in FR2. In addition, the frequency corresponding to the band n261 is 28 GHz. For example, if bands n2XX (e.g., n262) and n3XX (X is an integer of 0-9) with a frequency higher than 30 GHz are specified in the future, it may be determined in advance that for these bands, the case F (or the case F' or F") described above as an SSB pattern is assigned.

A band with a frequency higher than 30 GHz may be included in FR3, which may be newly defined. In addition or instead, for example, for bands n2XX (n262) and n3XX (X is an integer of 0-9) with a frequency higher than 30 GHz, it may be determined in advance that the case G (or the case G' or G") described above as an SSB pattern may be assigned. In addition or instead, for example, for bands n2XX (n262) and n3XX (X is an integer of 0-9) with a frequency higher than 30 GHz, it may be determined in advance that for a part, the case F (or the case F' or F") described above is assigned as the SSB pattern, and for the rest, the case G (or the case G' or G") described above is assigned as the SSB pattern. Especially in the case G, the UE first measures each beam (wide beam) in the SS burst in the first half part (first quarter frame) and determines whether or not there is a beam (e.g., best beam) having radio quality (e.g., received power, received quality) that exceeds a predetermined threshold value. If there is no beam that exceeds the threshold value, the UE may measure each beam (narrow beam) in the SS burst in the latter half part (second quarter frame) to determine whether or not there is the best beam that exceeds the predetermined threshold value. That is, the priority may be set according to the beam (SSB or SS burst) to be measured. This operation may be performed at the time of initial cell search, at the time of initial cell selection, or at the time of RACH initiation (early stage of random access procedure).

In addition, when the priority is notified from the base station device 20 to the terminal device 40, and the first beam sweeping and the second beam sweeping are provided in the same cell and the same BWP, the following may be performed. For example, in the case of a band corresponding to the case E, cell search and the like is performed in the case E to read a master information block (MIB) (PBCH) and a system information block (SIB). In the MIB and SIB, whether or not there is the latter half part (wide beam) of the case F (that is, SS burst of the cases A to C) or the number and locations of SSBs, and periodicity and offset information (for example, SSB-positions in burst, SSB-periodicity serving cell) may be included.

The UE performs cell search and the like only in the first half part like the case E (because it is predetermined). However, afterward, the UE may read the MIB and SIB and recognize (consider) the existence of the second half part (wide beam) like the case F (that is, the SS burst of the cases A to C), and in the beam measurement for reporting the best beam in an RACH procedure, measure both the first half part (narrow beam) and the latter half part (wide beam).

If at least one best beam (i.e., SSB) is detected in both the first and latter half parts, the wide beam one may be reported by the RACH (priority of beams to be reported). Instead, when whether or not there is the latter half part (wide beam) of the case F (that is, SS burst of the cases A to C), or the number and locations of SSBs, and periodicity and offset information (e.g., SSB-positions in burst, SSB-periodicity serving cell) is included in the MIB and SIB, the wide beams may be measured first, and if the threshold value is not satisfied, the narrow beams may be measured (priority of the beams to be measured).

Similarly, in the case of a band corresponding to the cases A to C, cell search and the like is performed in the cases A to C to read an MIB (PBCH) and an SIB. In the MIB and SIB, whether or not there is the latter half part (wide beam) of the case G (that is, SS burst of the case E) or the number and locations of SSBs, periodicity and offset information (for example, SSB-positions in burst, SSB-periodicity serving cell) may be included. The UE performs cell search and the like only in the first half part like the cases A to C (because it is predetermined). However, afterward, the UE may read the MIB and SIB and recognize (consider) the existence of the latter half part (wide beam) like the case G (that is, the SS burst of the case E), and in the beam measurement for reporting the best beam by the RACH, measure both the first half part (narrow beam) and the latter half part (wide beam).

If at least one best beam is detected in both the first half and the second half, the wide beam may be reported by the RACH (priority of the beam to be reported). Instead, when whether or not there is the latter half part (wide beam) of the case G (that is, SS burst of the case E), or the number and locations of SSBs, periodicity and offset information (e.g., SSB-positions in burst, SSB-periodicity serving cell) is included in the MIB and SIB, the wide beams may be measured first, and if the threshold value is not satisfied, the narrow beams may be measured (priority of the beams to be measured).

In addition, when the priority is notified from the base station device 20 to the terminal device 40, and the first beam sweeping and the second beam sweeping are provided in the same cell and different BWPs, the following may be performed. When a different type of beam sweeping (SSB pattern) is set for each of a plurality of adjacent cells (adjacent BWPs), and both satisfies the threshold value, the best beam of the beam sweeping of the cases A to C (wide beam) is reported preferentially.

2-6. Operation Example

Figure 14:
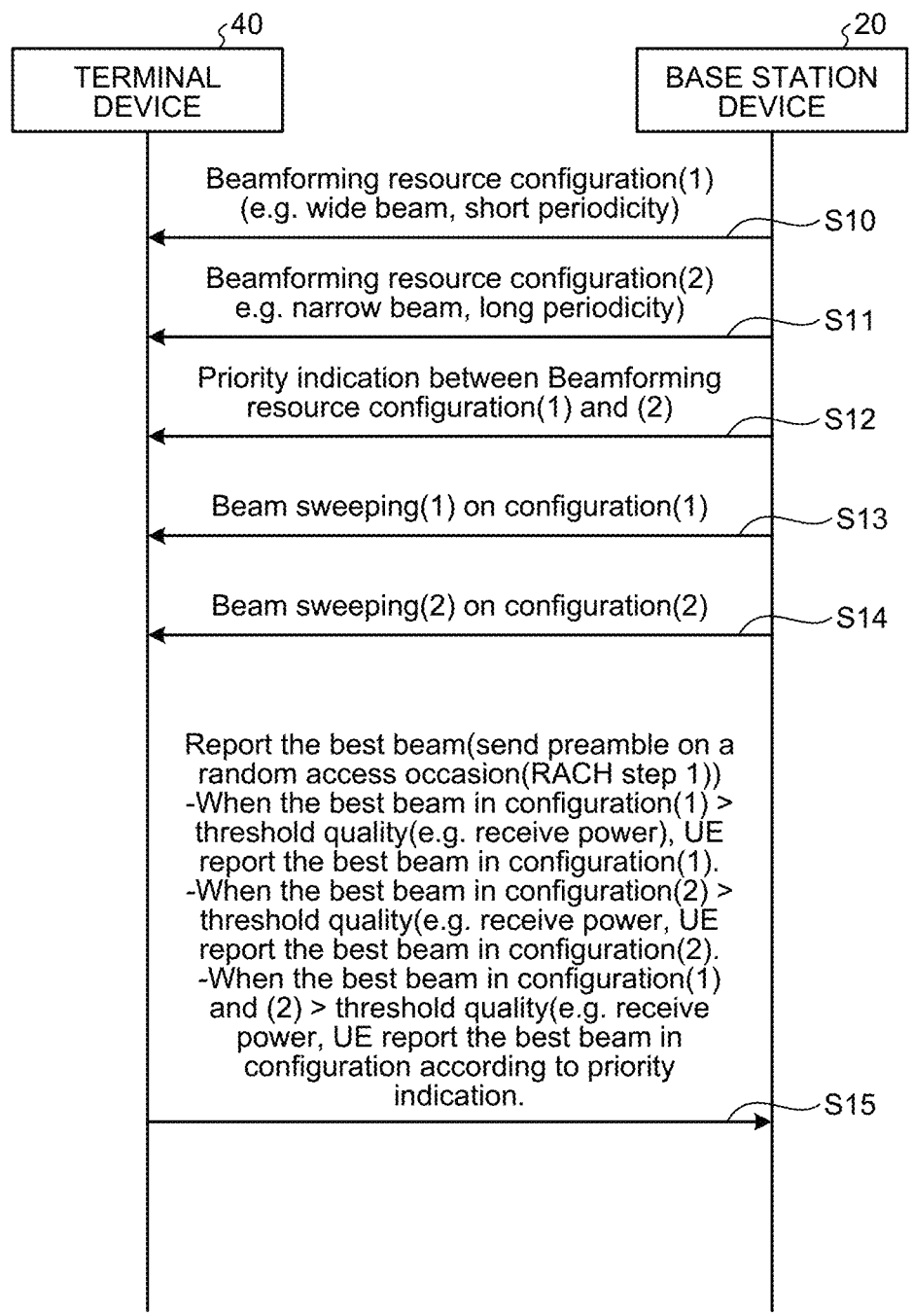
FIG. 14 is a diagram illustrating an operation example when a base station device 20 and a terminal device 40 according to the first embodiment start communication.

Next, an operation example of the communication system 1 according to the first embodiment will be described. FIG. 14 is a diagram illustrating an operation example when the base station device 20 and the terminal device 40 according to the first embodiment start communication. The base station device 20 performs various settings on the terminal device 40 by dedicated signaling (e.g., RRC dedicated signaling in a PCell as seen from an SCell) using system information and other cells (component carriers (CCs)). For example, the base station device 20 performs settings (beam sweeping configurations) of the first beam sweeping with a high frequency band and a narrow beam width and the second beam sweeping with a low frequency band and a wide beam width (S10 and S11). In addition, the base station device 20 performs settings, on the terminal device 40, related to the priority of the beam sweeping configurations of the first beam sweeping and the second beam sweeping (S12). In other words, the base station device 20 transmits system information or other RRC messages to the terminal device 40. The system information or other RRC messages include at least one of the beam sweeping configurations of the first beam sweeping and the second beam sweeping. Moreover, the system information or other RRC messages include settings related to the priority of a plurality of the beam sweeping configurations. One beam sweeping configuration may include at least one of the number and locations of SSBs, periodicity and offset information (for example, SSB-positions in burst, SSB-periodicity serving cell), indications indicating which one of the cases A to G (including F', G', F'', and G'') described above applies. The terminal device 40 sets its own configuration (UE configuration) based on the received configuration information regarding one or a plurality of the beam sweeping configurations and the priority of the plurality of beam sweeping configurations.

The system information may be transmitted using another cell (CC) with a lower frequency. If another cell (CC) (e.g., PCell as seen from SCell) is not used, information on the beamforming resource configuration needs to be acquired only in the information from the system information transmitted in the target cell (CC) (e.g., SCell). In the case of the system information, the beamformed PBCH (see FIG. 11) may include such information. In addition, the PBCH may include the priority of the beam sweeping or may include information that explicitly indicates the priority between the beam sweeping and other beam sweeping. In the case of a method of providing a dedicated configuration, the beam sweeping itself is cell-specific, and beam sweeping specific to the terminal device 40 may not normally be used. This is because, since the procedure is in the phase of random access, there is no information on the terminal device 40. Therefore, it is preferable, but not limited to, to convey the configurations using another cell (component carrier) that has already established a connection (e.g., RRC connection).

Then, the base station device 20 performs a plurality of types of beam sweeping on the terminal device 40. For example, the base station device 20 performs the first beam sweeping and the second beam sweeping (S13 and S14).

The terminal device 40 detects beams of the first beam sweeping and the second beam sweeping, and reports good quality beams to the base station device 20 in consideration of the priority (S15). At this time, the control unit 45 of the terminal device 40 determines the configuration to be reported to the base station from the configurations of the two types of beam sweeping to be received based on the priority between the plurality of types of beam sweeping of the synchronization signals (SSBs). For example, the control unit 45 determines whether each beam sweeping is of high quality enough to be reported. The terminal device 40 determines whether the measured value of the received power of the received beam (for example, reference signal received power (RSRP)) is a predetermined threshold value and determines that the beam sweeping, in which a beam is detected with a measured value of the received power equal to or higher than the threshold value, is of high quality. When each beam sweeping is of high quality enough to be reported, the terminal device 40 determines the beam sweeping to be reported in consideration of the priority. For example, the terminal device 40 determines that the beam sweeping having the highest priority among the plurality of types of high quality beam sweeping is the beam sweeping to be reported. The terminal device 40 reports to the base station device 20 the beam having the highest quality among the beams provided by the determined beam sweeping.

In addition, when only one of the plurality of types of beam sweeping has a beam that satisfies the quality, the terminal device 40 reports, to the base station device 20, the beam having the best quality from the beam sweeping that satisfies the quality.

Alternatively, the terminal device 40 determines which beam sweeping to be monitored in consideration of the first beam sweeping configuration, the second beam sweeping configuration, and the priority setting. Then, the terminal device 40 attempts to detect the beam using the beam sweeping configuration determined to be monitored, and when the beam is detected (i.e., when the radio quality (received power, received quality) of a certain beam exceeds the predetermined threshold value), the terminal device 40 reports the detected beam to the base station device 20.

As described above, according to the present embodiment, the terminal device 40 has the communication unit 41 (wireless communication unit) and the control unit 45. The control unit 45 receives at least one of a plurality of synchronization signals beamswept and transmitted via the wireless communication unit. The beam sweeping includes each of the plurality of synchronization signals forming different beams and the beams being transmitted from a base station (the base station device 20) during a predetermined period of time. The control unit 45 is configured to determine one piece of configuration information from a plurality of pieces of beam sweeping configuration information based on the priority between the plurality of beam sweeping and use the one piece of configuration information determined based on the priority to receive a synchronization signal or report the received synchronization signal to the base station. The number of the synchronization signals transmitted during a predetermined period of time varies among the plurality of pieces of beam sweeping configuration information. As a result, beams can be efficiently selected from the plurality of types of beam sweeping, and the beams can be operated efficiently. For example, for a terminal device that is close to the base station, beams can be operated efficiently by selecting a beam sweeping configuration in a near area where the beams are not narrowed.

In addition, the plurality of types of beam sweeping includes the first beam sweeping and the second beam sweeping. The frequency band used for the first beam sweeping is higher than the frequency band used for the second beam sweeping. The number of synchronization signals transmitted during the predetermined period of time as the first beam sweeping is larger than the number of synchronization signals transmitted during the predetermined period of time as the second beam sweeping. As a result, the downlink frequency and time resources required for beam sweeping for random access can be reduced by efficiently selecting beams according to the distance from the base station, and the beams can be operated efficiently.

3. Second Embodiment

Next, a second embodiment will be described. A communication system 1 according to the second embodiment includes the management device 10, the base station device 20, and the terminal device 40, similarly to the communication system 1 of the first embodiment. Since the configuration of each device included in the communication system 1 of the second embodiment is the same as that of the communication system 1 of the first embodiment, the description thereof will be omitted.

By the way, in the beam sweeping for random access, beams are specific to cell and not dedicated to each terminal device 40. However, if it is possible to provide beams for random access specific to the terminal device 40, there is a possibility of reducing the downlink frequency and time resources of the beam sweeping.

Figure 15:
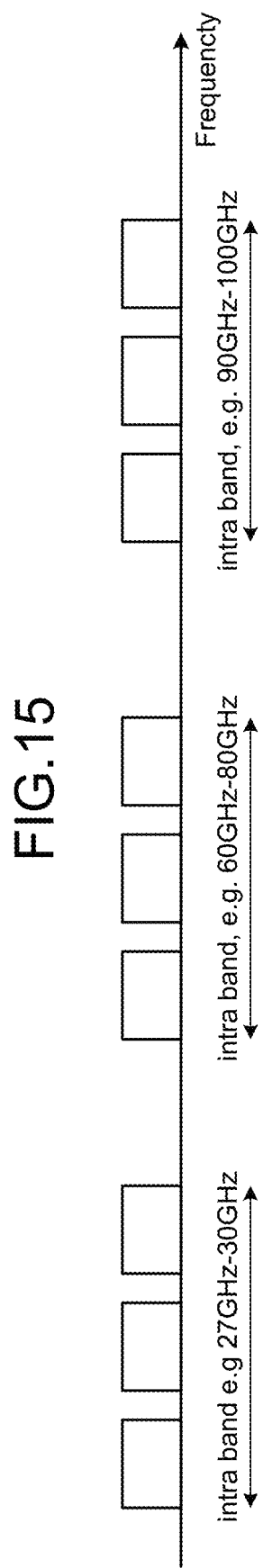
FIG. 15 is a diagram illustrating grouping of beams having same characteristics.

Therefore, in the second embodiment, cells or component carriers (CCs) are grouped at a frequency within a range in which the beam characteristics are the same. FIG. 15 is a diagram illustrating grouping of beams having the same characteristics. In FIG. 15, for each frequency band of 27 GHz to 30 GHz, 60 GHz to 80 GHz, and 90 GHz to 100 GHz, an intra band is illustrated in which three cells or CCs, whose similar beam characteristics are regarded similar, are grouped.

When the base station device 20 and the terminal device 40 are communicating in a cell (CC) of the intra band, directions of the transmitting beam and the receiving beam of both the base station device 20 and the terminal device 40 are decided for the cell (CC) in which communication is being performed. When the terminal device 40 further performs random access to another cell (CC) of the intra band, in the cell (CC) in which communication is already performed, it is assumed that the terminal device 40 can use a beam in the same direction as the beam directed to the terminal device 40. This is because, since the frequencies are close to each other, the characteristics of the propagation path are regarded as the same. Therefore, the base station device 20 uses a cell (CC) different from the cell (CC) in which communication is being performed in the intra band with respect to the terminal device 40 that is communicating to provide a beam specific to the terminal device 40 for random access in the same direction as the beam that is being communicated. For example, the base station device 20 performs beam sweeping in a predetermined range based on the direction of the beam that is being communicated. The predetermined range may be an angle range from the direction of the beam that is being communicated, or may be a range of a predetermined number of beams before and after the direction of the beam that is being communicated. In this way, by the beam sweeping of the base station device 20 with respect to the beam sweeping area specific to the UE (the terminal device 40), it is possible to reduce the beam overhead.

For the terminal device 40 that does not use any beam, at least one cell (CC) in the intra band, in which cells (CCs) are grouped, preferably provides random access by beam sweeping specific to cell. For example, although the base station device 20 provides beam sweeping specific to cell in one cell (CC) in the intra band, the base station device 20 provides beam sweeping specific to UE in other cells (CCs) in the intra band. For example, the base station device 20 provides a beam specific to cell for random access in a specific cell (CC) of the intra band. In addition, the base station device 20 provides beam sweeping specific to UE for random access based on a connection in the specific cell (CC) in other cells (CC) of the intra band. The beam sweeping for random access is preferably used. This is because it is necessary to measure a transmission delay between the base station and the terminal device 40 when using a new cell (CC). Moreover, even when the beam sweeping is set to be specific to UE, the beam sweeping can be used as random access sweeping shared by a plurality of the terminal devices 40, so that the beam sweeping can be used as beam sweeping for random access.

3-1. Operation Example

Figure 16:
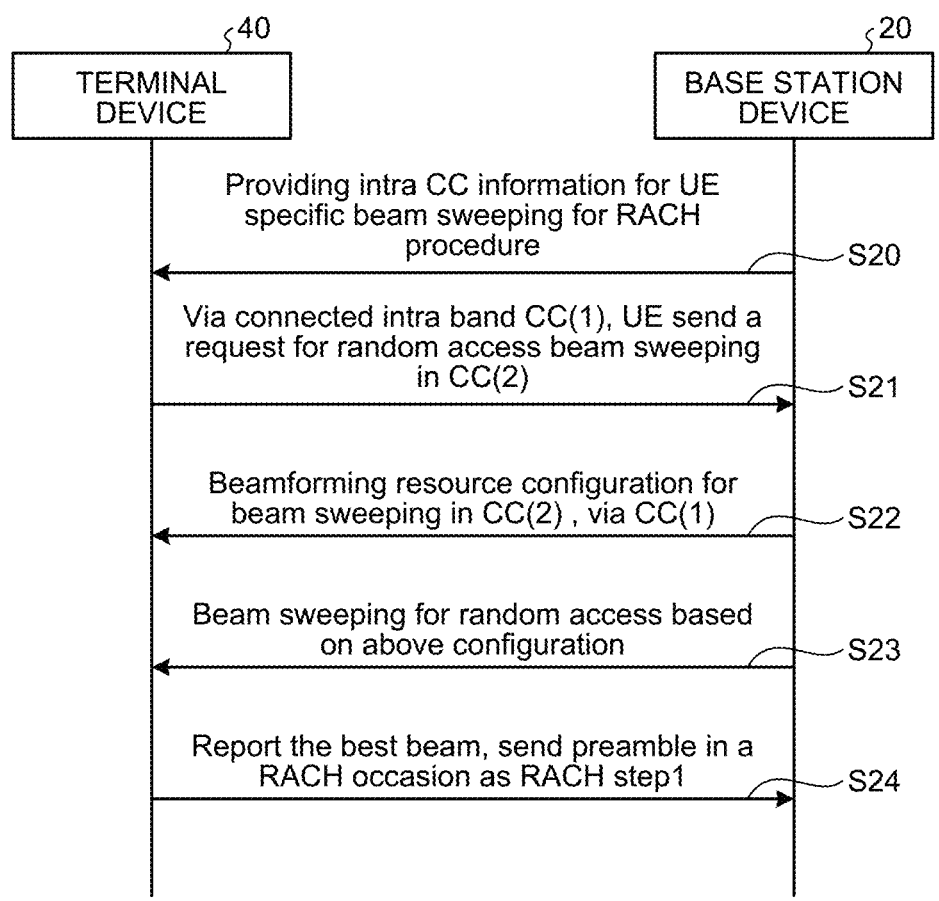
FIG. 16 is a diagram illustrating an operation example of a base station device and a terminal device according to a second embodiment.

FIG. 16 is a diagram illustrating an operation example of the base station device 20 and the terminal device 40 according to the second embodiment. The base station device 20 uses the cell (CC) in which communication is being performed (for example, cell (CC) (1)) to provide information for beam sweeping specific to UE to the terminal device 40 (S20). For example, the base station device 20 notifies the terminal device 40 of information on the intra band, that is, which CC is in the intra band.

The terminal device 40 uses the cell (CC) in which communication is being performed (e.g., cell (CC) (1)) to transmit a request for random access beam sweeping in another cell (CC) (e.g., cell (CC) (2)) in the intra band to the base station device 20 (S21).

For another cell (CC) (for example, cell (CC) (2)), the base station device 20 determines a configuration of a beam specific to the terminal device 40 for random access in the same direction as the beam in the cell in which communication is being performed (CC) (e.g., cell (CC) (1)). The base station device 20 uses the cell in which communication is being performed (CC) (for example, cell (CC) (1)) to notify the terminal device 40 of the determined beam sweeping configuration for random access (S22). Then, the base station device 20 performs the beam sweeping for random access for another cell (CC) (e.g., cell (CC) (2)) with the determined configuration (S23).

The terminal device 40 detects beams of the beam sweeping for another cell (CC) (e.g., cell (CC) (2)) and reports good quality beams to the base station device 20 (S24).

As described above, according to the present embodiment, when communication is being performed in one cell (CC) of the two types of beam sweeping having the same beam characteristics of the cells (CC), the base station device 20 performs the other type of beam sweeping in the same direction as the beams in the cell (CC) in which communication is being performed. The control unit 45 of the terminal device 40 determines the configuration to be reported to the base station device 20 from the other type of beam sweeping and reports the determined configuration to the base station device 20. As a result, the downlink frequency and time resources required for the beam sweeping for random access can be reduced, and the beams can be operated efficiently.

It has been disclosed that the present embodiment is applied to a plurality of cells (CC) in the intra band, but the present embodiment is not limited thereto. For example, the present embodiment can be applied to a plurality of BWPs in one cell. That is, the relationship between the intra band and the plurality of cells (CC) in the intra band may be replaced by the relationship between one cell and the plurality of BWPs in the one cell.

4. Third Embodiment

Next, a third embodiment will be described. A communication system 1 according to the third embodiment includes the management device 10, the base station device 20, and the terminal device 40, similarly to the communication system 1 of the first embodiment. Since the configuration of each device included in the communication system 1 of the second embodiment is the same as that of the communication system 1 of the first embodiment, the description thereof will be omitted.

By the way, when the activity of the terminal device 40 decreases and neither downlink nor uplink is used, the base station device 20 opens (disconnects) the communication connection with the core network, assuming that the terminal device 40 is no longer active. As a result, the terminal device 40 transitions to an idle state (for example, RRC_Idle or RRC_Inactive) such as an idle mode or an inactive mode. There are two conditions for returning from the idle state in two cases, which are, for example, when uplink traffic occurs on the terminal device 40 side, or when there is an incoming call such as a telephone call from the network side (base station device 20 side). In either case, the terminal device 40 needs to perform random access again to connect to the network (the base station device 20). At this time, the terminal device 40 may not have a connection of another cell (CC) (RRC connection in e.g., a PCell) as in the second embodiment. There is also the connection method shown in the first embodiment, but when the terminal device 40 is at an edge of the cell, the connection method shown in the first embodiment has a long cycle, so that it is difficult to promptly resume connection with the network.

Therefore, in the third embodiment, a beam for random access for the idle state is provided for a terminal so that the network connection is promptly resumed. The beam for random access is a downlink beam, which is a beamformed SSB in FIG. 11. The cycle for providing the beam is set on the network side (the base station device 20) before the terminal device 40 transitions to the idle state. The terminal device 40 performs a tracking area update of the beam for random access before going out of the range of the beam. The tracking area update of the beam for random access is completely different from a normal tracking area update and is an update for the network side to grasp which beam is desirable for the terminal device 40 even if the terminal device 40 idles. The normal tracking area update updates which group the base station group, which transmits a paging message, is and is completely different from the tracking area update of the beam for random access.

Even while idling, when the terminal device 40 goes out of the set beam range, the terminal device 40 connects to the network once and moves to a movement destination. After configuring the cycle and beam sweeping at the movement destination, the terminal device 40 transitions to the idle state. In this case, it is necessary to notify the network side (the base station device 20 side) of the beam sweeping range (beam directivity range) desired by the terminal device 40.

There are two possible methods for requesting beam sweeping that the terminal device 40 notifies the network side.

Method 1: One or a plurality of SSBs that is desirable are specified among the SSBs (see FIG. 11), which are the frequency and time resources for random access provided by the base station.

Method 2: One of the SSBs is specified among the SSBs (see FIG. 11), which are the frequency and time resources for random access provided by the base station, and the provision of SSBs in the vicinity is notified by the level. It is defined that the level represents, for example, the number of SSBs in the vicinity of the specified SSB. When representing the number of SSBs in the vicinity, the level can be defined as follows, for example. For example, when level 1 is specified, a range of three SSBs adjacent to each other before and after the specified SSB is set as the range of beam sweeping.

Level 1: Three SSBs
Level 2: Five SSBs
Level 3: Seven SSBs

The range of beam sweeping can be provided by the base station side by default, but it is better to cause the terminal device 40 to specify the range of beam sweeping. This is because some terminal devices 40 require a number of beams that can cover a wide area, and other terminal devices 40 can tolerate even a number of beams that can cover a narrow area. The terminal device 40 that desires a wide range of beam sweeping while idling is a terminal that moves slightly even within a narrow range. The procedure for determining the range of beam sweeping for the UE (terminal device 40) in the idle state is important.

Therefore, the base station device 20 sets the beam sweeping for the idle state in a UE-specific manner in order to promptly resume communication with the terminal device 40 before the terminal device 40 transitions to the idle state. The configuration of the beam sweeping for the idle state includes the number of resources required for the beam and the cycle in which a burst of these resources appears periodically. When configuring the beam sweeping for the idle state, the terminal device 40 makes a request to the base station device 20 regarding the cycle and the beam range. The base station device 20 periodically requests the terminal device 40 to reply with respect to the set beam sweeping, and if there is no reply, the resources required for the beam sweeping may be increased so that the beam sweeping is performed over a wide range. When the terminal device 40 cannot receive the beam sweeping from the base station device 20 while idling, the terminal device 40 performs a random access procedure using the beam sweeping, which has a long cycle but performs beam sweeping over a wide range.

4-1. Operation Example

FIG. 17 is a diagram illustrating an operation example of the management device 10, the base station device 20, and the terminal device 40 according to the third embodiment. The terminal device 40 sends a request regarding a configuration of the beam sweeping for the idle state, such as the beam sweeping cycle and beam sweeping range, to the base station device 20 (S30). The terminal device 40 and the base station device 20 transition to the idle state such as the inactive mode (S31). After transitioning to the idle state, the base station device 20 sends a request for disconnecting the communication with the management device 10 when the timer counts up after the predetermined standby time elapses (S32). The management device 10 transmits a permission to disconnect the connection to the base station device 20 (S33). The base station device 20 opens a communication connection with the management device 10.

The base station device 20 determines the beam sweeping cycle and beam sweeping range for the idle state based on the requested beam sweeping configuration. For example, the base station device 20 determines the beam sweeping cycle and beam sweeping range for the idle state based on the requested beam sweeping configuration and various other conditions. Various conditions include, for example, the movement of the terminal device 40 and the amount of tolerable resources. The movement of the terminal device 40 can be determined from the transition of the beam used for the communication of the terminal device 40 up to that point. When the terminal device 40 is moving, the base station device 20 determines the beam sweeping range so as to expand the range in the moving direction. In addition, when the amount of tolerable resources is limited, the base station device 20 determines the beam sweeping range within the range of the amount of the tolerable resources. The base station device 20 may simply determine the requested beam sweeping cycle and beam sweeping range as the beam sweeping cycle and beam sweeping range for the idle state.

The base station device 20 notifies the terminal device 40 of the beam sweeping configuration for the idle state (S34). After receiving the configuration, the terminal device 40 notifies the base station device 20 of acknowledgement (ACK) (e.g., HARQ ACK) (S35). Then, the terminal device 40 transitions to the idle state.

When the terminal device 40 notifies the base station device 20 of the ACK, the base station device 20 performs the beam sweeping for the idle state within the determined beam sweeping cycle and beam sweeping range (S36). Even while idling, when the terminal device 40 goes out of the set beam range, the terminal device 40 connects to the base station device 20 and re-sends a request for configuring the beam sweeping for resuming communication to the base station device 20 so as to update the configuration (S37). For example, when the base station device 20 goes out of the set beam range, the base station device 20 updates the beam sweeping range so that the movement destination is in the beam range. The base station device 20 performs the beam sweeping for the idle state within the updated beam sweeping cycle and beam sweeping range (S38).

When returning from the idle state, the terminal device 40 detects the beam sweeping for the idle state and resumes communication.

The base station device 20 may operate as follows. When the base station device 20 provides the beam sweeping for the idle state, a reply from the terminal device 40 is monitored. Based on the report returned by the terminal device 40, when there is no reply, the base station device 20 may perform operation of slightly increasing the beam range. The terminal device 40 observes beams, and when there is no beam addressed to the terminal device 40, the terminal device 40 waits for the next cycle assuming that the beam range will be expanded. If no beam is observed even in the next cycle, beam sweeping is performed in all directions, but random access is performed to the base station device 20 based on the beam sweeping having a long cycle As described above, according to the present embodiment, before transitioning to the idle state, the control unit 45 of the terminal device 40 sends, to the base station device 20, a request regarding the beam sweeping configuration including the beam sweeping cycle and the beam sweeping range and then transitions to the idle state. When returning from the idle state, the control unit 45 detects the beam sweeping transmitted from the base station device 20 based on the configuration and resumes communication. As a result, it is possible to promptly return from the idle state while reducing the downlink frequency and time resources required for the beam sweeping for random access.

5. Modification Example

The above-described embodiments show examples, and various modifications and applications are possible.

For example, the processing device (control device) that controls the management device 10, the base station device 20, or the terminal device 40 of the present embodiment may be realized by a dedicated computer system or a general-purpose computer system.

For example, a communication program for executing the above operation is stored in a computer-readable recording medium such as an optical disk, a semiconductor memory, a magnetic tape, or a flexible disk and distributed. Then, for example, the control device is configured by installing the program on a computer and executing the above-mentioned processing. At this time, the control device may be the management device 10, the base station device 20, or a device outside the terminal device 40 (for example, a personal computer). Alternatively, the control device may be the management device 10, the base station device 20, or a device inside the terminal device 40 (for example, the control unit 13, the control unit 24, or the control unit 45).

In addition, the communication program may be stored in a disk device provided in a server device on a network such as the Internet so that the program can be downloaded to a computer or the like. Moreover, the above-mentioned functions may be realized by collaboration between the operating system (OS) and the application software. In this case, a part other than the OS may be stored in a medium and distributed, or the part other than the OS may be stored in the server device so that the part can be downloaded to a computer or the like.

In addition, among the processing described in the above-described embodiments, all or a part of the processing described as being automatically performed can be manually performed, or the processing described as being manually performed can be automatically performed by a known method. In addition, the processing procedures, specific names, and information including various data and parameters shown in the above description and drawings can be appropriately changed unless otherwise specified. For example, the variety of information illustrated in each figure is not limited to the illustrated information.

Moreover, each component of each of the illustrated devices is a functional concept and does not necessarily have to be physically configured as illustrated in the figure. That is, the specific form of distribution and integration of each device is not limited to the one illustrated in the figure, and all or part of the device can be functionally or physically distributed and integrated in appropriate units according to various loads and usage conditions.

Moreover, the above-described embodiments can be appropriately combined in an area where the processing contents do not contradict each other. Moreover, the order of steps illustrated in the flowcharts and the sequence diagrams of the above-described embodiments can be changed as appropriate.

Moreover, for example, the present embodiment can be implemented as any configuration constituting a device or a system such as a processor as a system large scale integration (LSI) or the like, a module using a plurality of processors or the like, a unit using a plurality of modules or the like, or a unit and a set or the like to which other functions are added (that is, configuration of a part of the device).

In the present embodiment, the system means a set of a plurality of components (devices, modules (parts), etc.), and it does not matter whether all the components are in the same housing. Therefore, a plurality of devices housed in separate housings and connected via a network, and one device in which a plurality of modules is housed in one housing are both systems.

Moreover, for example, the present embodiment can have a cloud computing configuration in which one function is shared by a plurality of devices via a network and jointly processed.

Although the embodiments of the present disclosure have been described above, the technical scope of the present disclosure is not limited to the above-described embodiments as they are, and various modifications can be made without departing from the gist of the present disclosure. In addition, constituent elements in different embodiments and modifications may be appropriately combined.

In addition, the effects according to the embodiments described in the present specification are merely examples and are not limited, and other effects may be provided.

Note that the present technique can also have the following configurations.

(1)
A terminal device comprising:
a wireless communication unit; and
a control unit that receives at least one of a plurality of synchronization signals transmitted after undergoing beam sweeping via the wireless communication unit, wherein
the beam sweeping includes each of a plurality of synchronization signals forming a different beam and transmitted from a base station during a predetermined period of time,
the control unit determines, from among a plurality of pieces of beam sweeping configuration information, one piece of the configuration information based on a priority between a plurality of types of beam sweeping, and
receives the synchronization signal or reports the received synchronization signal to the base station by using the one piece of the configuration information determined based on the priority, and
a number of synchronization signals transmitted during the predetermined period of time is different among the plurality of pieces of beam sweeping configuration information.

(2)
The terminal device according to (1), wherein
the plurality of types of beam sweeping includes first beam sweeping and second beam sweeping,
a frequency band used for the first beam sweeping is higher than a frequency band used for the second beam sweeping, and
a number of synchronization signals transmitted during the predetermined period of time as the first beam sweeping is larger than a number of synchronization signals transmitted during the predetermined period of time as the second beam sweeping.

(3)
The terminal device according to (2), wherein at least second beam sweeping configuration information among the plurality of pieces of beam sweeping configuration information is transmitted from the base station.

(4)
The terminal device according to any one of (1) to (3), wherein the plurality of types of beam sweeping is performed in one bandwidth part (BWP) in one cell indicated by one physical cell ID (PCI).

(5)
The terminal device according to any one of (1) to (3), wherein the plurality of types of beam sweeping is performed in a plurality of different bandwidth parts (BWPs) in one cell indicated by one physical cell ID (PCI).

(6)
The terminal device according to any one of (1) to (5), wherein the plurality of types of beam sweeping is performed in a plurality of cells having different physical cell IDs (PCIS).

(7)
The terminal device according to any one of (1) to (6), wherein the priority is received from the base station.

(8)
The terminal device according to any one of (1) to (7), wherein
the plurality of types of beam sweeping includes first beam sweeping and second beam sweeping performed in different cells or bandwidth parts (BWPs),
characteristics of a beam used in the first beam sweeping performed in one of the cells or BWPs is regarded as same as characteristics of a beam used in the second beam sweeping performed in another one of the cells or BWPs, and
when the base station is communicating with the terminal device in the one cell or BWP, the base station transmits the beam in the another cell or BWP in a same direction as the beam used in the one cell or BWP in which communication is being performed.

(9)
The terminal device according to any one of (1) to (8), wherein
before transitioning to an idle state, the control unit transmits a request regarding a beam sweeping configuration including a beam sweeping cycle and a beam sweeping range to a base station and transitions to the idle state, and when returning from the idle state, the control unit detects beam sweeping transmitted from the base station based on the configuration and resumes communication.

(10)
A communication method comprising:
receiving, via a wireless communication unit, at least one of a plurality of synchronization signals, each of which forming a different beam and transmitted from a base station after undergoing beam sweeping during a predetermined period of time;
determining, from among a plurality of pieces of beam sweeping configuration information, one piece of the configuration information based on priority between a plurality of types of beam sweeping; and receiving the synchronization signal or reporting the received synchronization signal to the base station by using the one piece of the configuration information determined based on the priority, wherein a number of the synchronization signals transmitted during the predetermined period of time is different among the plurality of pieces of beam sweeping configuration information.

(11)

A communication program that causes a computer included in a terminal device to function as a control unit that receives at least one of a plurality of synchronization signals transmitted after undergoing the beam sweeping via the wireless communication unit, in which the beam sweeping includes each of a plurality of synchronization signals forming a different beam and transmitted from a base station during a predetermined period of time, the control unit determines, from among a plurality of pieces of beam sweeping configuration information, one piece of the configuration information based on a priority between a plurality of types of beam sweeping, and receives the synchronization signal or reports the received synchronization signal to the base station by using the one piece of the configuration information determined based on the priority, and a number of synchronization signals transmitted during the predetermined period of time is different among the plurality of pieces of the beam sweeping configuration information.

(12)

A base station device including:

a wireless communication unit; and a control unit that, during communication with a terminal device, using any component carrier of a plurality of component carriers grouped at a frequency within a range where beam characteristics are the same, performs controlling, by using another component carrier of the plurality of component carriers, for providing a beam for random access from the wireless communication unit in a same direction as a beam that is being communicated to the terminal device that is being communicated.

(13)

The base station device according to (12), in which the control unit performs controlling to perform beam sweeping within a predetermined range based on a direction of the beam that is being communicated.

(14)

A communication method including, during communication with a terminal device, using any component carrier of a plurality of component carriers grouped at a frequency within a range where beam characteristics are the same, performing controlling, by using another component carrier of the plurality of component carriers, for providing a beam for random access from a wireless communication unit in a same direction as a beam that is being communicated to the terminal device that is being communicated.

(15)

A communication program that causes a computer included in a base station device, during communication with a terminal device, using any component carrier of a plurality of component carriers grouped at a frequency within a range where beam characteristics are the same, to function as a control unit that performs controlling, by using another component carrier of the plurality of component carriers, for providing a beam for random access from a wireless communication unit in a same direction as a beam that is being communicated to the terminal device that is being communicated.

(16)

A base station device including:

a wireless communication unit; and a control unit, upon receiving a request regarding a beam sweeping configuration including a beam sweeping cycle and a beam sweeping range from a terminal device that transitions to an idle state via the wireless communication unit, based on the requested beam sweeping configuration, determines the beam sweeping cycle and the beam sweeping range and performs controlling to perform beam sweeping within the determined cycle and range.

(17)

The base station device according to (16), in which the control unit increases the beam sweeping range when there is no reply from the terminal device to beam sweeping.

(18)

A communication method including:

determining a beam sweeping cycle and a beam sweeping range upon receiving a request regarding a beam sweeping configuration including the beam sweeping cycle and the beam sweeping range from a terminal device that transitions to an idle state via a wireless communication unit, based on the requested beam sweeping configuration; and performs controlling of the wireless communication unit to perform beam sweeping within the determined cycle and range.

(19)

A communication program that causes a computer included in a base station device to function as a control unit that, upon receiving a request regarding a beam sweeping configuration including a beam sweeping cycle and a beam sweeping range from a terminal device that transitions to an idle state via a wireless communication unit, based on the requested beam sweeping configuration, determines the beam sweeping cycle and the beam sweeping range and performs controlling of the wireless communication unit to perform beam sweeping within the determined cycle and range.

REFERENCE SIGNS LIST

1 COMMUNICATION SYSTEM
10 MANAGEMENT DEVICE
20 BASE STATION DEVICE
40 TERMINAL DEVICE
11, 21, 41 COMMUNICATION UNIT
12, 22, 42 STORAGE UNIT
13, 24, 45 CONTROL UNIT
44 INPUT/OUTPUT UNIT
211, 411 RECEPTION PROCESSING UNIT
211a WIRELESS RECEPTION UNIT
211b MULTIPLE SEPARATION UNIT
211c DEMODULATION UNIT
211d DECODING UNIT
212, 412 TRANSMISSION PROCESSING UNIT
212a CODING UNIT
212b MODULATION UNIT
212c MULTIPLEXING UNIT
212d WIRELESS TRANSMISSION UNIT
214, 414 ANTENNA

The invention claimed is:

1. A terminal device comprising:
a wireless communication unit; and
a control unit that receives at least one of a plurality of synchronization signals transmitted after undergoing beam sweeping via the wireless communication unit, wherein
the beam sweeping includes each of a plurality of synchronization signals forming a different beam and transmitted from a base station during a predetermined period of time,
the control unit determines, from among a plurality of pieces of beam sweeping configuration information, one piece of the configuration information based on a priority between a plurality of types of beam sweeping, and
receives the synchronization signal or reports the received synchronization signal to the base station by using the one piece of the configuration information determined based on the priority, and
a number of synchronization signals transmitted during the predetermined period of time is different among the plurality of pieces of beam sweeping configuration information.

2. The terminal device according to claim 1, wherein
the plurality of types of beam sweeping includes first beam sweeping and second beam sweeping,
a frequency band used for the first beam sweeping is higher than a frequency band used for the second beam sweeping, and
a number of synchronization signals transmitted during the predetermined period of time as the first beam sweeping is larger than a number of synchronization signals transmitted during the predetermined period of time as the second beam sweeping.

3. The terminal device according to claim 2, wherein at least second beam sweeping configuration information among the plurality of pieces of beam sweeping configuration information is transmitted from the base station.

4. The terminal device according to claim 1, wherein the plurality of types of beam sweeping is performed in one bandwidth part (BWP) in one cell indicated by one physical cell ID (PCI).

5. The terminal device according to claim 1, wherein the plurality of types of beam sweeping is performed in a plurality of different bandwidth parts (BWPs) in one cell indicated by one physical cell ID (PCI).

6. The terminal device according to claim 1, wherein the plurality of types of beam sweeping is performed in a plurality of cells having different physical cell IDs (PCIs).

7. The terminal device according to claim 1, wherein the priority is received from the base station.

8. The terminal device according to claim 1, wherein
the plurality of types of beam sweeping includes first beam sweeping and second beam sweeping performed in different cells or bandwidth parts (BWPs),
characteristics of a beam used in the first beam sweeping performed in one of the cells or BWPs is regarded as same as characteristics of a beam used in the second beam sweeping performed in another one of the cells or BWPs, and
when the base station is communicating with the terminal device in the one cell or BWP, the base station transmits the beam in the another cell or BWP in a same direction as the beam used in the one cell or BWP in which communication is being performed.

9. The terminal device according to claim 1, wherein
before transitioning to an idle state, the control unit transmits a request regarding a beam sweeping configuration including a beam sweeping cycle and a beam sweeping range to a base station and transitions to the idle state, and when returning from the idle state, the control unit detects beam sweeping transmitted from the base station based on the configuration and resumes communication.

10. A communication method comprising:
receiving, via a wireless communication unit, at least one of a plurality of synchronization signals, each of which forming a different beam and transmitted from a base station after undergoing beam sweeping during a predetermined period of time;
determining, from among a plurality of pieces of beam sweeping configuration information, one piece of the configuration information based on priority between a plurality of types of beam sweeping; and
receiving the synchronization signal or reporting the received synchronization signal to the base station by using the one piece of the configuration information determined based on the priority, wherein
a number of the synchronization signals transmitted during the predetermined period of time is different among the plurality of pieces of beam sweeping configuration information.

* * * * *